United States Patent [19]

Uema et al.

[11] Patent Number: 5,119,628
[45] Date of Patent: Jun. 9, 1992

[54] CATALYST DEGRADATION DIAGNOSING APPARATUS FOR AIR FUEL RATIO CONTROL SYSTEM

[75] Inventors: Hideki Uema, Zushi; Kohei Mitsuhashi, Yokosuka; Masaaki Uchida, Yokosuka; Yuki Nakajima, Yokosuka, all of Japan

[73] Assignee: Nissan Motor Co., Ltd., Japan

[21] Appl. No.: 719,703

[22] Filed: Jun. 27, 1991

[30] Foreign Application Priority Data

Jul. 9, 1990 [JP] Japan .................. 2-181074

[51] Int. Cl.⁵ ............................... F01N 3/18
[52] U.S. Cl. ......................... 60/274; 60/276; 60/277
[58] Field of Search ............ 60/274, 276, 277; 123/198 B

[56] References Cited

U.S. PATENT DOCUMENTS

| | | | |
|---|---|---|---|
| 4,007,589 | 2/1977 | Neidhard et al. | 60/276 |
| 4,622,809 | 11/1986 | Abthoff et al. | 60/274 |
| 4,809,501 | 3/1989 | Kayanuma et al. | 60/274 |
| 4,884,066 | 11/1989 | Miyata et al. | 60/276 |
| 5,018,348 | 5/1991 | Dürschmidt et al. | 60/274 |

FOREIGN PATENT DOCUMENTS 61-286550 12/1986 Japan .
145193 2/1989 Japan .................. 60/276

Primary Examiner—Ira S. Lazarus
Assistant Examiner—L. Heyman
Attorney, Agent, or Firm—Lowe, Price, LeBlanc & Becker

[57] ABSTRACT

To reliably diagnose catalyst degradation in an air fuel ratio control system without being subjected to the influence of engine operating conditions, a front $O_2$ sensor output VFO and a rear $O_2$ sensor output VRO are detected on both the upstream and downstream sides of catalytic converter; air fuel ratio feedback correction coefficients $\alpha$ are determined on the basis of basic feedback control constants $P_{R,L}$ or $i_{R,L}$ and correction values PHOS according to rich and lean air fuel ratio conditions; periods T and amplitudes $\alpha_R - \alpha_L$ of the air fuel ratio feedback correction coefficient $\alpha$ are measured; a rich discriminating catalyst diagnosing slice level RSLH2 is set higher than a rich discriminating air fuel ratio feedback controlling slice level RSH1 and a lean discriminating catalyst diagnosing slice level RSLL2 is set lower than a lean discriminating air fuel ratio feedback controlling slice level RSLL1 in such a way that RSLH2 increases and RSLL2 decreases with increasing product of the period and amplitude of $\alpha$; the number $j_F$ of times when the front sensor output VFO changes across a stoichiometric mixture ratio $SL_F$ is connected; the number $j_R$ of times when the rear sensor output VRO changes across the slice levels RSLH2 and RSLL2 is counted; and the catalyst is determined to be degraded if $j_R/j_F \geq k$, where $k < 1$.

5 Claims, 16 Drawing Sheets

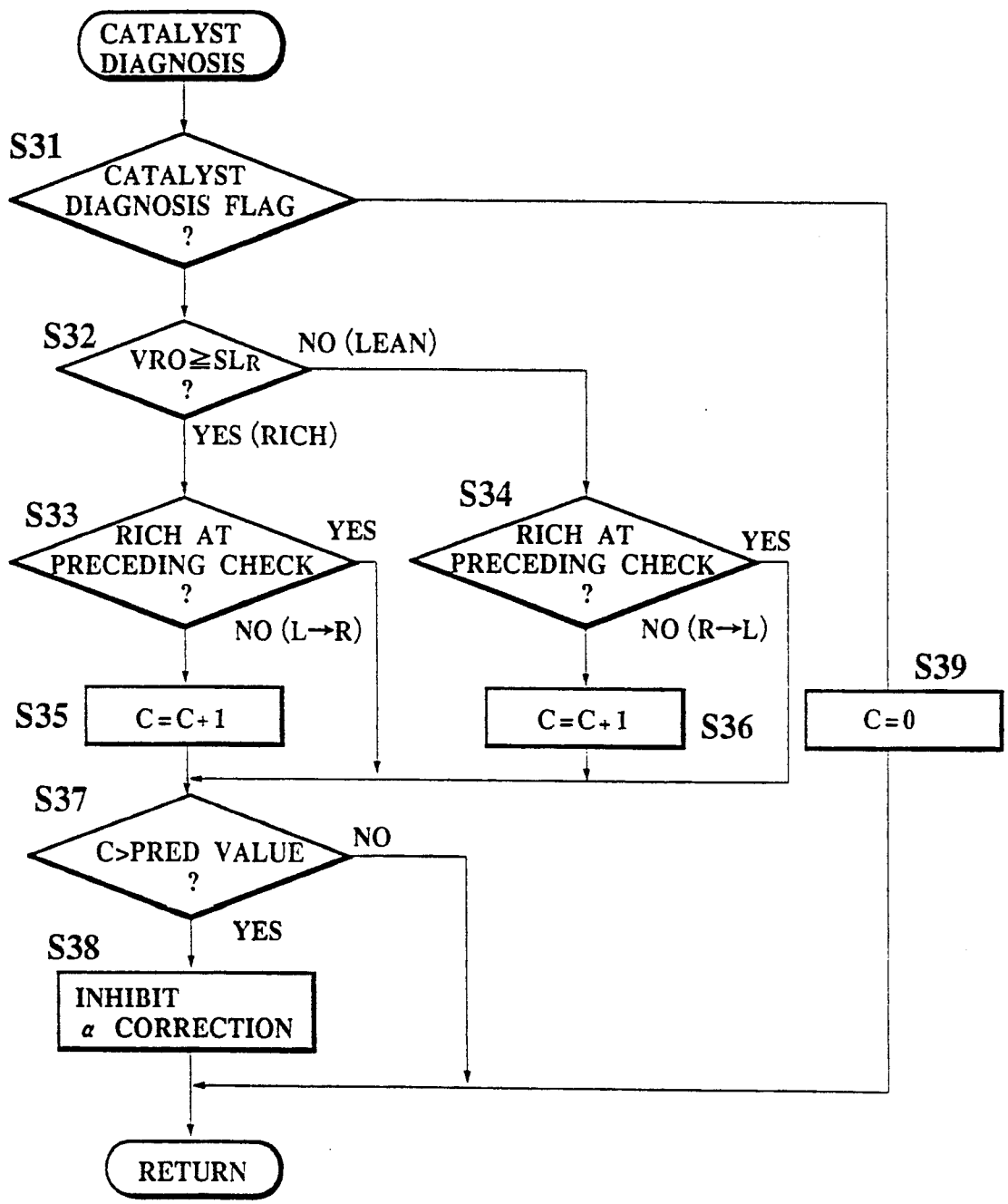

INVENTION

CATALYST DEGRADATION DIAGNOSING APPARATUS FOR AIR FUEL RATIO CONTROL SYSTEM

BACKGROUND OF THE INVENTION

1. Field of the Invention

The present invention relates to a catalyst degradation diagnosing apparatus for an air fuel ratio control system, and more specifically to a catalyst degradation diagnosing apparatus which can reliably diagnose catalyst degradation without being subjected to the influence of engine operating conditions.

2. Description of the Prior Art

An apparatus for diagnosing catalyst degradation in a so-called double $O_2$ sensor system (such that two oxygen sensors are disposed on the upstream (front) side and downstream (rear) side of a catalytic converter, respectively) is disclosed in Japanese Published Unexamined (Kokai) Patent Appli. No. 61-286550.

FIG. 1A is a routine for calculating an air fuel ratio feedback correction coefficient $\alpha$ on the basis of an output voltage signal VFO of the front $O_2$ sensor, which is executed at predetermined time intervals. In more detail, control first checks whether air fuel ratio feedback condition F/B by the front $O_2$ sensor $FO_2$ is established (in step S1). If NO, control proceeds to step S9 to fix the correction coefficient $\alpha$. The feedback condition is not established when the coolant temperature Tw is below a predetermined value or the output voltage signal of the front $O_2$ sensor is not yet inverted once (because the amount of fuel is increasing at engine start or immediately after engine start or during engine warming up) or no fuel exists. However, the air fuel ratio feedback condition is usually established except the above conditions.

If YES, control compares the front $O_2$ sensor output voltage VFO with a slice level $SL_F$ corresponding a stoichiometric mixture ratio (a theoretical air fuel ratio) and determines that the air fuel ratio is on the rich side if $VFO \geq SL_F$ and on the lean side if $VFO < SL_F$ (in step S2). Further, control checks again whether the air fuel ratio is rich at the proceeding check (in steps S3 and S4). Therefore, four cases can be obtained on the basis of the check result (in steps S2 to S4), and the respective air fuel ratio feedback correction coefficients $\alpha$ are calculated according to the check result (in steps S5 to S8) as follows:

(1) In the case of steps S2→S3→S5, control determines that the air fuel ratio has just been inverted from the lean side to the rich side, and subtracts a proportional value $P_R$ (where the suffix R denotes the rich side) from the current air fuel ratio feedback correction coefficient $\alpha$ as $(\alpha = \alpha - P_R)$, so that the air fuel ratio is stepwise returned to the lean side.

(2) In the case of steps S2→S3→S6, control determines that the ratio is still rich, and subtract an integration value $I_R$ from the current coefficient $\alpha$ as $(\alpha = \alpha - I_R)$, so that the air fuel ratio is gradually returned to the lean side.

(3) In the case of steps S2→S4→S7, control determines that the ratio has just been inverted from the rich side to the lean side and add a proportional value $P_L$ (where the suffix L denotes the lean side) to the current coefficient $\alpha$ as $(\alpha = \alpha + P_L)$, so that the air fuel ratio is similarly stepwise returned to the rich side.

(4) In the case of steps S2→S4→S8 control determines that the ratio is still lean and add an integration value $I_L$ to the current coefficient $\alpha$ as $(\alpha = \alpha + I_L)$, so that the air fuel ratio is gradually returned to the rich side. FIG. 1E-1 shows a wareform of the front $O_2$ sensor output voltage VFO and FIG. 1E-2 shows a wareform of the air fuel ratio correction coefficient $\alpha$ both with the lapse of time, by way of example.

FIG. 1B is a routine for further correcting the air fuel ratio feedback correction coefficient $\alpha$ already corrected on the basis of the front $O_2$ sensor output voltage signal VFO (as shown in FIG. 1A), additionally on the basis of the rear $O_2$ sensor output voltage signal VRO, which is also executed at predetermined time intervals. In more detail, control first checks whether air fuel ratio feedback condition F/B by the rear $O_2$ sensor $RO_2$ is established (in step S11). If YES, control proceeds to step S12 and compares the rear $O_2$ sensor output voltage VRO with a slice level $SL_R$ corresponding to a stoichiometric mixture ratio and determines that the air fuel ratio is on the lean side if $VRO < SL_R$, and proceeds to steps S13 and S14. However, if $VRO \geq SL_R$, control determines that the air fuel ratio is on the rich side and proceeds to steps S15 and S16.

In step S13, a constant value $\Delta P_L$ is further added to the proportional value $P_L$ as $(P_L = P_L + \Delta P_L)$; and in step S14, a constant value $\Delta P_R$ is further subtracted from the proportional value $P_R$ as $(P_R = P_R - \Delta P_R)$, so that the air fuel ratio is shifted as a whole to the rich side. In the same way, in step S15, a constant value $\Delta P_L$ is subtracted from the proportional value $P_L$ as $(P_L = P_L - \Delta P_L)$; and in step S16, a constant value $\Delta P_R$ is added to the proportional value $P_R$ as $(P_R = P_R + \Delta P_L)$, so that the air fuel ratio is shifted to the lean side. As described above, the precision of the air fuel ratio feedback control on the basis of the front $O_2$ sensor output voltage can be improved by the control of the correction coefficient $\alpha$ corrected on the basis of the rear $O_2$ sensor output voltage VRO as shown in FIG. 1B.

FIG. 1C shows a routine for calculating a fuel injection pulse width Ti, which is executed at predetermined crank angular intervals.

Control calculates a basic fuel injection pulse width $T_p = K \cdot Qa/Ne$ (where K denotes a constant) on the basis of an intake air amount Qa and an engine speed Ne and with reference to a map (in step S21). Control calculates an addition Co of 1 and various correction coefficients (e.g. coolant temperature increase correction coefficients $K_{TW}$) (in step S22), and determines a fuel injection pulse width Ti to be outputted to a fuel injector in accordance with the following expression (in step S23):

$$Ti = Tp \cdot Co \cdot \alpha + Ts$$

where Ts denotes the ineffective pulse width. Control sets the determined Ti (in step S24).

FIG. 1D shows a routine for diagnosing catalyst degradation. Control first checks whether a catalyst degradation diagnosis flag is set (in step S31). If NO, control resets the counter value to zero (in step S39). If YES, control compares the rear $O_2$ sensor output voltage VRO with a slice level $SL_R$ corresponding to a stoichiometric mixture (theoretical air fuel) ratio and determines that the air fuel ratio is on the rich side if $VRO \geq SL_R$ and on the lean side if $VFO < SL_F$ (in step S32). Further, control checks again whether the air fuel ratio is rich at the proceeding check (in steps S33 and S34). The counter value C is incremented by one in steps 35 and 36 on the basis of the check result (in steps S32 to S34). This counter value represents the number of inversions of the rear O2 sensor output voltage VRO across the slice level $SL_R$.

Control compares the counter value C with a predetermined value (in step S37) and determines that the catalyst has been degraded if C exceeds the predetermined value, and inhibits the feedback coefficient $\alpha$ from being corrected by the rear O2 sensor (in step S38).

However, the prior-art apparatus for diagnosing catalyst degradation as described above involves the following drawbacks. Even in the feedback control by the front O2 sensor disposed on the upstream side of the catalytic converter, since the controlled air fuel ratio inevitably fluctuates slightly, when the air fuel ratio fluctuates under the condition that the output voltage VRO of the rear O2 sensor disposed on the downstream side of the catalytic converter is controlled near the slice level $SL_R$, the rear O2 sensor output voltage VRO also fluctuates due to the fluctuations in the air fuel ratio. For instance, in the case of the new catalyst, the rear O2 sensor output VRO fluctuates slightly near the slice level $SL_R$, as shown on the left side in FIG. 9A. In the case of the used catalyst, however, the rear O2 sensor output VRO fluctuates violently as shown on the right side in FIG. 9A.

Therefore, if the slice level $SL_R$ (shown at the step S12 in FIG. 1B) for feedback controlling the air fuel ratio on the basis of the rear O2 sensor output is the same as the slice level $SL_R$ (shown at the step S32 in FIG. 1D) for diagnosing the catalyst degradation, since the fluctuation period of the new catalyst is the same as that of the old catalyst and therefore the number of inversions of the rear O2 sensor output level across the slice level $SL_R$ is the same in both the new and used catalyst, it is impossible to detect the difference in catalyst degradation between the new catalyst and the used catalyst, thus it has been difficult to precisely diagnose the catalyst degradation.

To overcome the above-mentioned problem, it is possible to discriminate the used catalyst from the new catalyst or vice versa, by determining the slice level for feedback controlling the air fuel ratio and that for diagnosing the catalyst degradation separately as shown in FIG. 9B, in such a way that a rich discriminating slice level RSLH2 for diagnosing the catalyst degradation is set higher than a rich discriminating slice level RSLH1 for feedback controlling air fuel ratio and further a lean discriminating slice level RSLL2 for diagnosing the catalyst degradation is set lower than a lean discriminating slice level RSLL1 for feedback controlling air fuel ratio. This is because the inversion of the rear O2 sensor output level across the slice levels RSLH2 and RSLL2 for diagnosing the catalyst degradation can be detected only when the catalyst has been degraded.

In this method, however, since the amplitude and the period of the fluctuation waveform of the rear O2 sensor output VRO shown in FIGS. 9A and 9B vary according to engine operating conditions, when the slice levels RSLH2 and RSLL2 for diagnosing the catalyst degradation are fixedly determined, the rear O2 sensor output VRO changes in the same catalyst beyond or below the slice level RSLH2 or RSLL2, respectively according to the engine operating conditions, thus resulting in diagnosis error.

SUMMARY OF THE INVENTION

With these problems in mind, therefore, it is the primary object of the present invention to provide a catalyst degradation diagnosing apparatus for an air fuel ratio control system, which can reliably detect the catalyst degradation without being subjected to the influence of engine operating conditions.

To achieve the above-mentioned object, the present invention provides a catalyst degradation diagnosing apparatus for an air fuel ratio control system, comprising: (a) operating condition sensing means (31,32) for sensing engine operating conditions; (b) basic fuel amount calculating means (33) for calculating a basic fuel amount (Tp) according to the sensed engine operating conditions; (c) front air fuel ratio sensing means (34) disposed upstream of a catalytic converter (6), for generating a front sensor signal (VFO); (d) rear air fuel ratio sensing means (37) disposed downstream of the catalytic converter (6), for generating a rear sensor signal (VRO); (e) inversion discriminating means (35) for discriminating whether the front sensor signal (VFO) level is inverted to rich (R) or lean (L) side across a stoichiometric mixture ratio ($SL_F$); (f) basic control constant determining means (36) for determining a basic air fuel ratio feedback control constant ($P_{R,L}$ or $i_{R,L}$) on the basis of a result discriminated by said inversion discriminating means; (g) rich/lean discriminating means (38) for discriminating whether the rear sensor signal (VRO) level is on rich or lean side of an air fuel ratio feedback controlling slice level (SL1); (h) correction value calculating means (39) for calculating a correction value (PHOS) of the basic control constant ($P_{R,L}$ or $i_{R,L}$) on the basis of a result discriminated by said rich/lean discriminating means; (i) feedback correction coefficient determining means (40) for determining an air fuel ratio feedback correction coefficient ($\alpha$) on the basis of the basic control constant ($P_{R,L}$ or $i_{R,L}$) corrected by the correction value (PHOS); (j) fuel injection amount determining means (41) for determining a fuel injection amount (Ti) by correcting the basic fuel injection amount (Tp) by the air fuel ratio feedback correction coefficient ($\alpha$); (k) catalyst degradation diagnosing slice level determining means (44) for determining a catalyst degradation diagnosing slice level (SL2) according to the sensed engine operating conditions, in addition to the air fuel ratio feedback controlling slice level (SL1); and (1) catalyst degradation discriminating means (45) for discriminating whether catalyst is degraded by comparing the rear sensor signal (VRO) level with the catalyst degradation diagnosing slice level (SL2).

Further, the catalyst degradation diagnosing slice level determining means (44) comprises: (a) period measuring means (47) for measuring a period (T) of the air fuel ratio feedback correction coefficient $\alpha$ on the basis of the result discriminated by said inversion discriminating means (35); (b) amplitude measuring means (48) for measuring an amplitude ($\alpha_R - \alpha_L$) of the air fuel ratio feedback correction coefficient $\alpha$ on the basis of the result discriminated by said inversion discriminating means (48); and (c) catalyst degradation diagnosing slice level setting means (49) for setting a rich discriminating catalyst diagnosing slice level (RSLH2) higher than a rich discriminating air fuel ratio feedback controlling slice level (RSLH1) and a lean discriminating catalyst diagnosing slice level (RSLL2) lower than a lean discriminating air fuel ratio feedback controlling slice level (RSLL1), in such a way that the rich discriminating catalyst diagnosing slice level (RSLH2) increases and the lean discriminating catalyst diagnosing slice level (RSLL2) decreases both with increasing any one of the measured period and amplitude of the air fuel ratio feedback correction coefficient ($\alpha$). Further, the catalyst degradation diagnosing slice level setting means (49) sets a rich discriminating catalyst diagnosing slice level (RSLH2) higher than a rich discriminating air fuel ratio feedback controlling slice level (RSLH1) and a lean discriminating catalyst diagnosing slice level (RSLL2) lower than a lean discriminating air fuel ratio feedback controlling slice level (RSLL1), in such a way that the rich discriminating catalyst diagnosing slice level (RSLH2) increases and the lean discriminating catalyst diagnosing slice level (RSLL2) decreases both with increasing product of the measured period and amplitude of the air fuel ratio feedback correction coefficient ($\alpha$).

Further, the present invention provides a method of diagnosing catalyst degradation in an air fuel ratio control system, comprising the steps of: (a) detecting air fuel ratio upstream of a catalytic converter and outputting a front sensor signal (VFO) corresponding thereto; (b) detecting air fuel ratio downstream of the catalytic converter and outputting a rear sensor signal (VRO) corresponding thereto; (c) checking whether the front sensor signal output (VFO) is inverted to rich (R) or lean (L) side across a stoichiometric mixture ratio ($SL_F$); (d) determining a basic air fuel ratio feedback control constant ($P_{R, L}$, $i_{R, L}$) according to the rich or lean side; (e) checking whether the rear sensor signal output (VRO) is inverted to rich (R) or lean (L) side across an air fuel ratio feedback controlling slice level (SL1); (f) calculating a correction value (PHOS) of the basic air fuel ratio feedback control constant ($P_{R, L}$ or $i_{R, L}$) according to the rich or lean side; (g) determining an air fuel ratio feedback correction coefficient ($\alpha$) on the basis of the basic feedback control constant ($P_{R, L}$ or $i_{R, L}$) corrected by the correction value (PHOS); (h) measuring a period (T) of the air fuel ratio feedback correction coefficient ($\alpha$); (i) measuring an amplitude ($\alpha_R - \alpha_L$) of the air fuel ratio feedback correction coefficient ($\alpha$); (j) setting a rich discriminating catalyst diagnosing slice level (RSLH2) higher than a rich discriminating air fuel ratio feedback controlling slice level (RSLH1) and a lean discriminating catalyst diagnosing slice level (RSLL2) lower than a lean discriminating air fuel ratio feedback controlling slice level (RSLL1) in such a way that the rich discriminating catalyst diagnosing slice level (RSLH2) increases and the lean discriminating catalyst diagnosing slice level (RSLL2) decreases both with increasing any one of the measured period and amplitude of air fuel ratio feedback correction coefficient ($\alpha$); (k) counting the number ($j_F$) of inversions of the front sensor signal (VFO) across the stoichiometric mixture ratio ($SL_F$); (l) counting the number ($j_R$) of inversions of the rear sensor signal (VRO) across the set catalyst diagnosing slice levels (RSLH2, RSLL2); and (m) checking whether the ratio of the rear sensor counted value ($j_R$) to the front sensor counted value ($j_F$) exceeds a predetermined value; and (n) determining that the catalyst has been degraded if the ratio ($j_R/j_F$) exceeds a predetermined value.

In the catalyst degradation diagnosing apparatus of the present invention, the catalyst degradation diagnosing slice level (SL2) is determined according to the engine operating conditions, in addition to the air fuel ratio feedback controlling slice level (SL1). Further, a rich discriminating catalyst diagnosing slice level (RSLH2) is set higher than a rich discriminating air fuel ratio feedback controlling slice level (RSLH1) and a lean discriminating catalyst diagnosing slice level (RSLL2) is set lower than a lean discriminating air fuel ratio feedback controlling slice level (RSLL1) in such a way that the rich discriminating catalyst diagnosing slice level (RSLH2) increases and the lean discriminating catalyst diagnosing slice level (RSLL2) decreases both with increasing any one of or the product of the period and amplitude of the air fuel ratio feedback correction coefficient ($\alpha$).

This is because the amplitude of the rear $O_2$ sensor output VRO increases with increasing amplitude or period of the correction coefficient $\alpha$ after the catalyst has been degraded, the hysteresis width of the diagnosing slice levels between RSLH2 and RSLL2 is allowed to be also increased with increasing amplitude and period of the correction coefficient $\alpha$. Therefore, the catalyst degradation can be reliably diagnosed even when the amplitude of $\alpha$ fluctuates violently according to engine operating conditions.

BRIEF DESCRIPTION OF THE DRAWINGS

FIG. 1D is a flowchart for assistance in explaining a prior-art routine for diagnosing catalyst degradation;

DETAILED DESCRIPTION OF THE PREFERRED EMBODIMENTS

With reference to the attached drawings, the apparatus for diagnosing catalyst degration according to the present invention will be described hereinbelow.

Figure 2A:
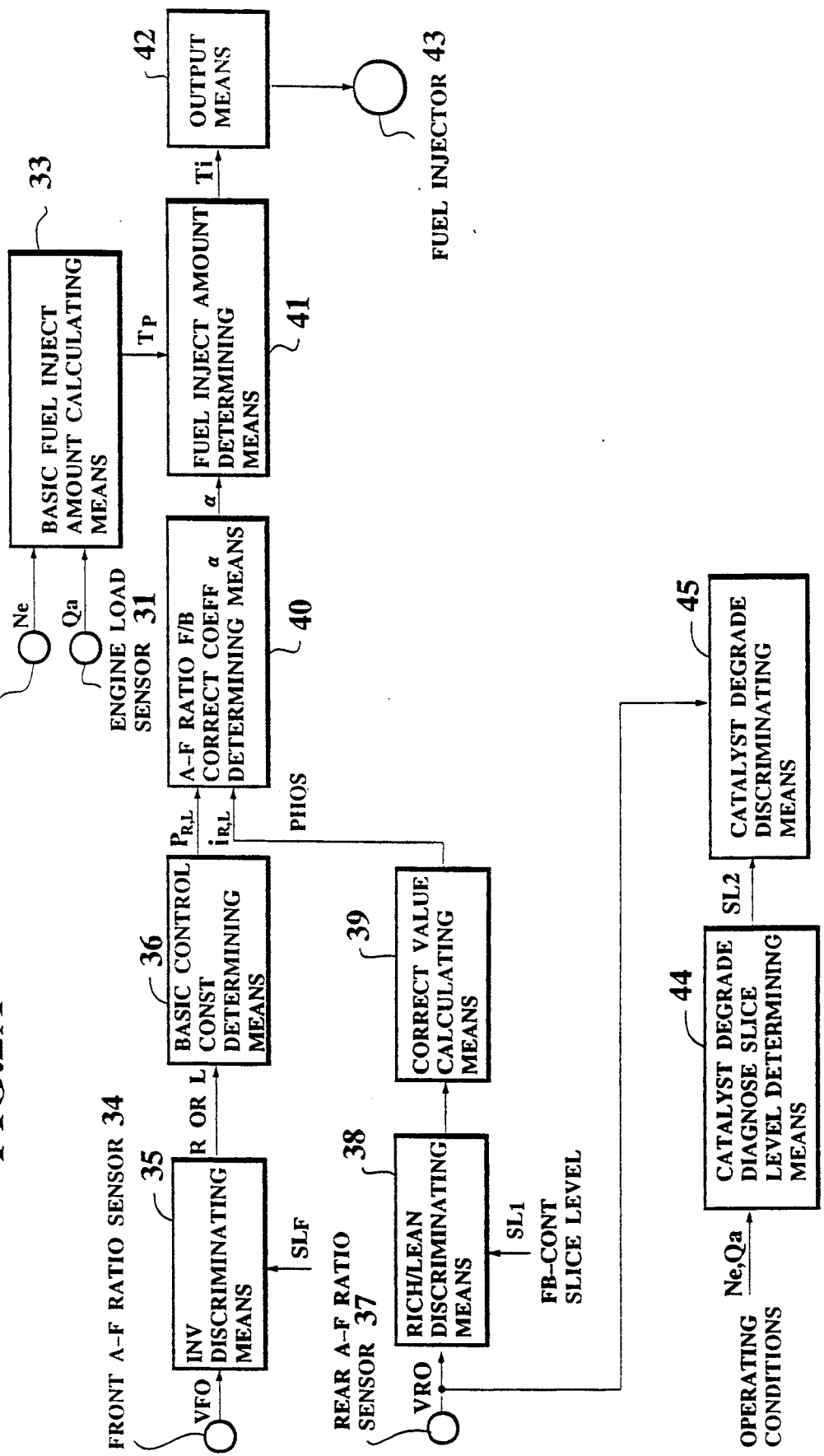
FIGS. 2A and 2B are block diagrams showing embodiments of the catalyst degradation diagnosing apparatus for an air fuel ratio control system according to the present invention, respectively.

FIG. 2(A) is a block diagram showing a basic embodiment thereof, which comprises: in addition to an air fuel ratio control system, catalyst degradation diagnosing slice level determining means 44 for determining a catalyst degradation diagnosing slice level SL2 according to engine operating condition, in addition to a slice level SL1 for feedback controlling air fuel ratio; and catalyst degradation discriminating means 45 for discriminating whether catalyst in a catalystic converter has been degraded on the basis of comparison between the catalyst degradation diagnosing slice level SL2 and a second (rear) air fuel ratio (e.g. $O_2$) sensor output VRO.

Here, the air fuel ratio control system comprises an engine load (e.g. intake air amount Qa) sensor 31; an engine revolution speed (Ne) sensor 32; basic fuel injection amount calculating means 33 for calculating a basic fuel injection amount Tp on the basis of the sensed engine load and speed; a first (front) air fuel ratio (e.g. $O_2$) sensor 34 disposed in an exhaust passage on the upstream side of a catalytic converter, for outputting an output signal VFO according to exhaust air fuel ratio; inversion discriminating means 35 for discriminating whether the first sensor output VFO is inverted to the rich or lean side with a target value as a border by comparing the sensor output VFO with a predetermined target value (e.g. stoichiometric mixture ratio); basic control constant determining means 36 for determining a basic control constant $P_{R,L}$ or $i_{R,L}$ (e.g. proportional map value) for air fuel ratio feedback control so that the sensor output VFO can be controlled near the target value on the basis of the inversion discriminated result R or L; a second (rear) air fuel ratio (e.g. $O_2$) sensor 37 disposed in the exhaust passage on the downstream side of the catalytic converter, for outputting an output signal VRO according to exhaust air fuel ratio; rich/lean discriminating means 38 for discriminating whether the second sensor output VRO is on rich or lean side R or L of an air fuel ratio feedback controlling slice level SL1 by comparing the second sensor output VRO with the air fuel ratio feedback controlling slice level SL1; correction value calculating means 39 for calculating a correction value PHOS of the basic control constant on the basis of the rich/lean discriminated result; air fuel ratio feedback correct amount determining means 40 for determining an air fuel ratio feedback correction coefficient $\alpha$ on the basis of the basic control constant value $P_{R,L}$ or $i_{R,L}$ corrected by the correction amount PHOS; fuel injection amount determining means 41 for determining a fuel injection amount Ti by correcting the basic fuel injection amount Tp on the basis of the air fuel ratio feedback correction coefficient $\alpha$; and output means 42 for outputting the determined fuel injection amount Ti to a fuel injector 4.

In the basic embodiment, the catalyst degradation diagnosing slice level determining means 44 determines the catalyst degradation diagnosing slice level SL2 to be the higher than the air fuel ratio feedback controlling slice level SL1 according to engine operating conditions in such a way that SL2 increases with increasing air fuel ratio feedback correction coefficient $\alpha$. The reason is as follows: since the amplitude of the rear $O_2$ sensor output VRO increases with increasing amplitude or period of the correction coefficient $\alpha$ after the catalyst has been degraded, the hysteresis width of the catalyst diagnosing slice levels is allowed to be also increased with increasing amplitude or period of the correction coefficient $\alpha$. Therefore, it is possible to obtain the same diagnosing result even if the amplitude of $\alpha$ fluctuates according to engine operating conditions.

Figure 2B:
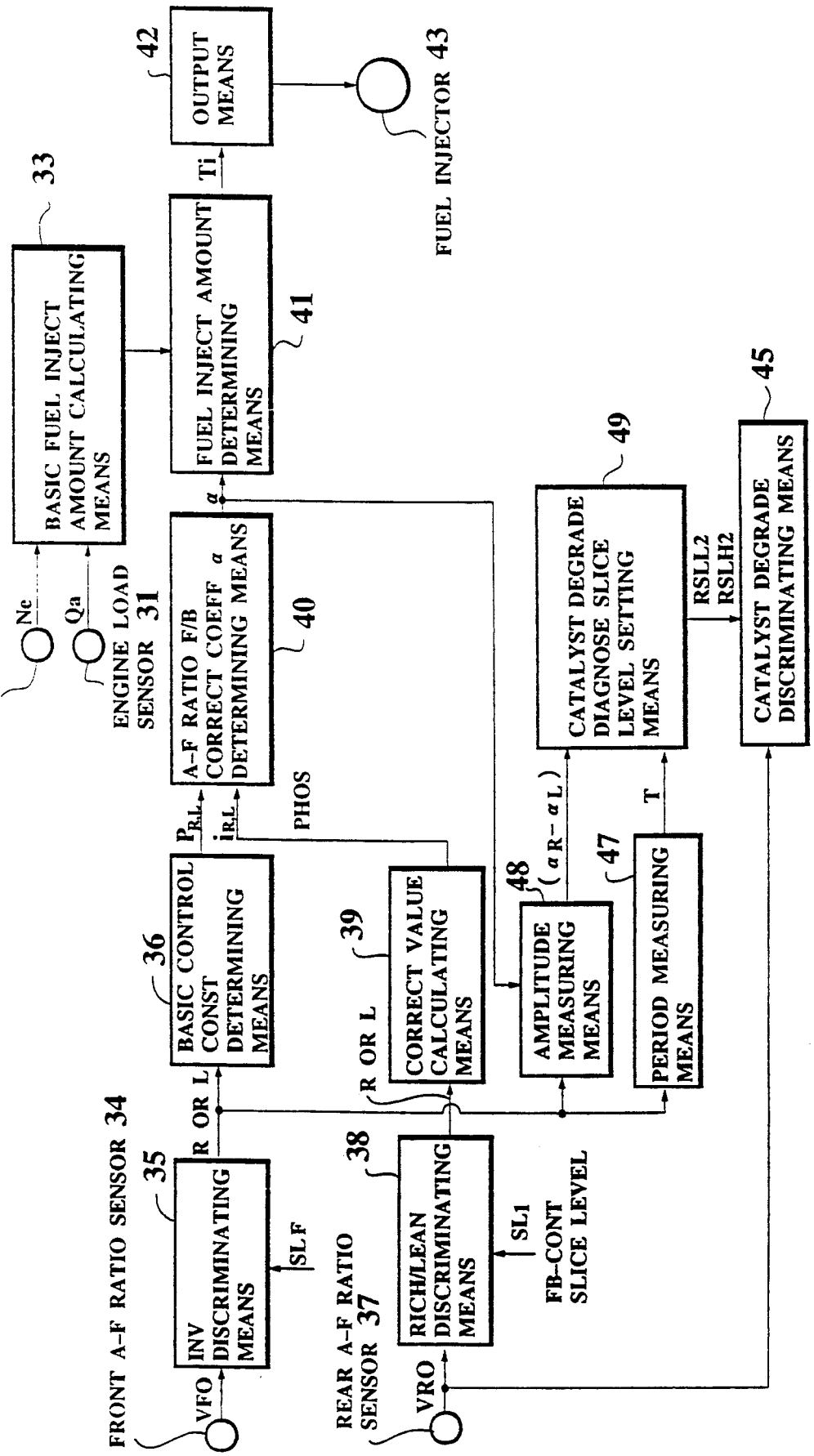

FIG. 2(B) is a block diagram showing another embodiment thereof, which comprises: in addition to an air fuel ratio control system, period measuring means 47 for measuring period T of the air fuel ratio feedback correction coefficient $\alpha$ on the basis of the discriminated result of the inversion discriminating means 35; amplitude measuring means 48 for measuring amplitude of the air fuel ratio feedback correction coefficient $\alpha$ on the basis of the discriminated result of the inversion discriminating means 35 and the current air fuel ratio feedback correction coefficient $\alpha$; catalyst degradation diagnosing slice level determining means 49 for determining a rich discriminating catalyst degradation diagnosing slice level RSLH2 to be higher than the air fuel ratio feedback controlling slice level SL1 and additionally a lean discriminating catalyst degradation diagnosing slice level RSLL2 to be lower than the air fuel ratio feedback controlling slice level SL1, both according to any one of or the product of the measured amplitude $(\alpha_R - \alpha_L)$ and period T; and catalyst degradation discriminating means 45 for discriminating whether catalyst in a catalytic converter has been degraded, by comparison between the catalyst degradation diagnosing slice levels RSLH2 and RSLL2 and the second sensor output VRO.

In the second embodiment, the catalyst degradation diagnosing slice level determining means 49 determines the rich and lean discriminating catalyst diagnosing slice levels RSLH2 and RSLL2 according to any one of or the product of the period and amplitude of the correction coefficient $\alpha$. Therefore, it is possible to prevent erroneous diagnosis during severe engine operating conditions where the correction coefficient $\alpha$ increases in both amplitude and period, thus improving the diagnosis precision.

Figure 1A:
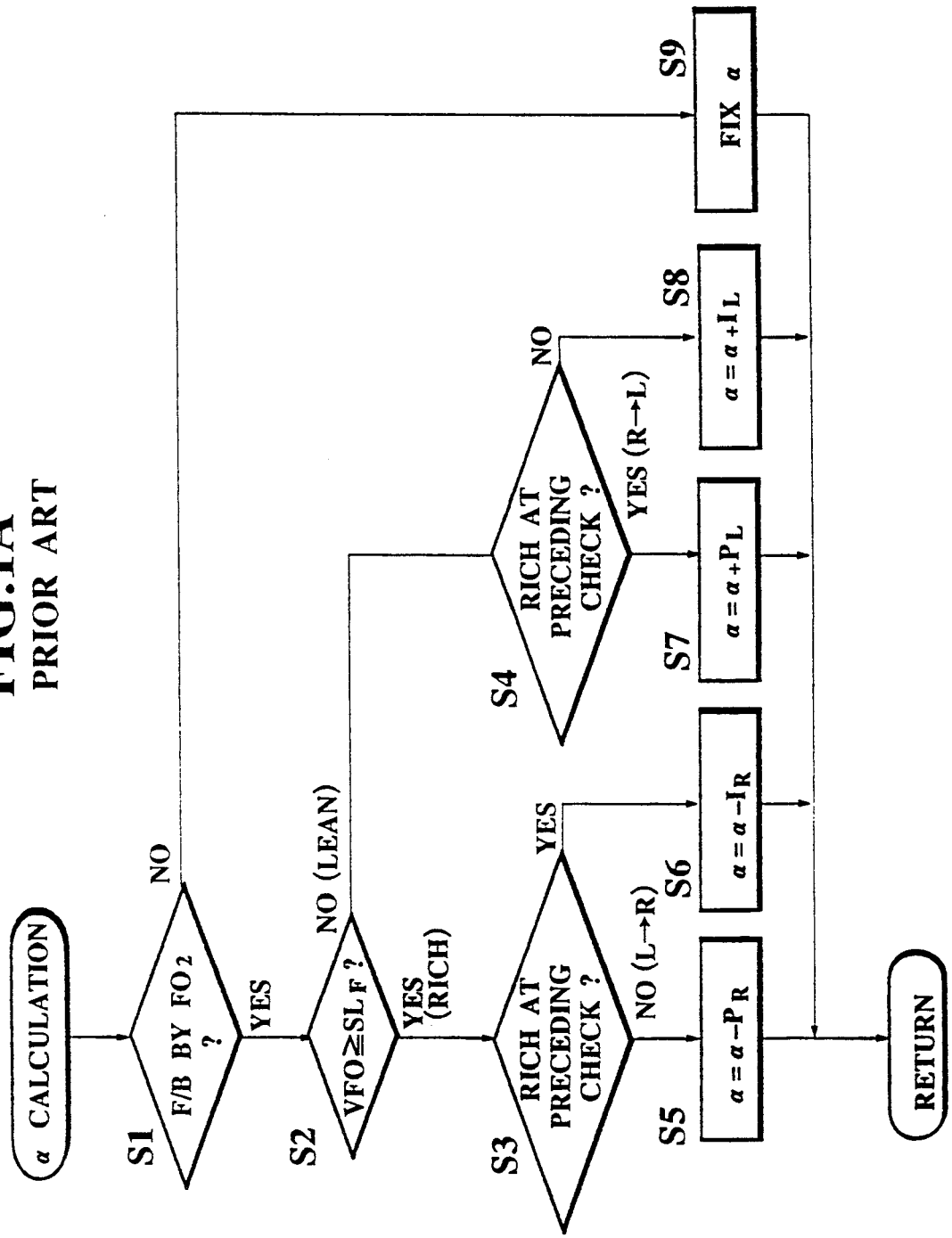
FIG. 1A is a flowchart for assistance in explaining a prior-art routine for calculating the air fuel ratio feedback correction coefficient $\alpha$ on the basis of the front $O_2$ sensor output VFO.
Figure 1B:
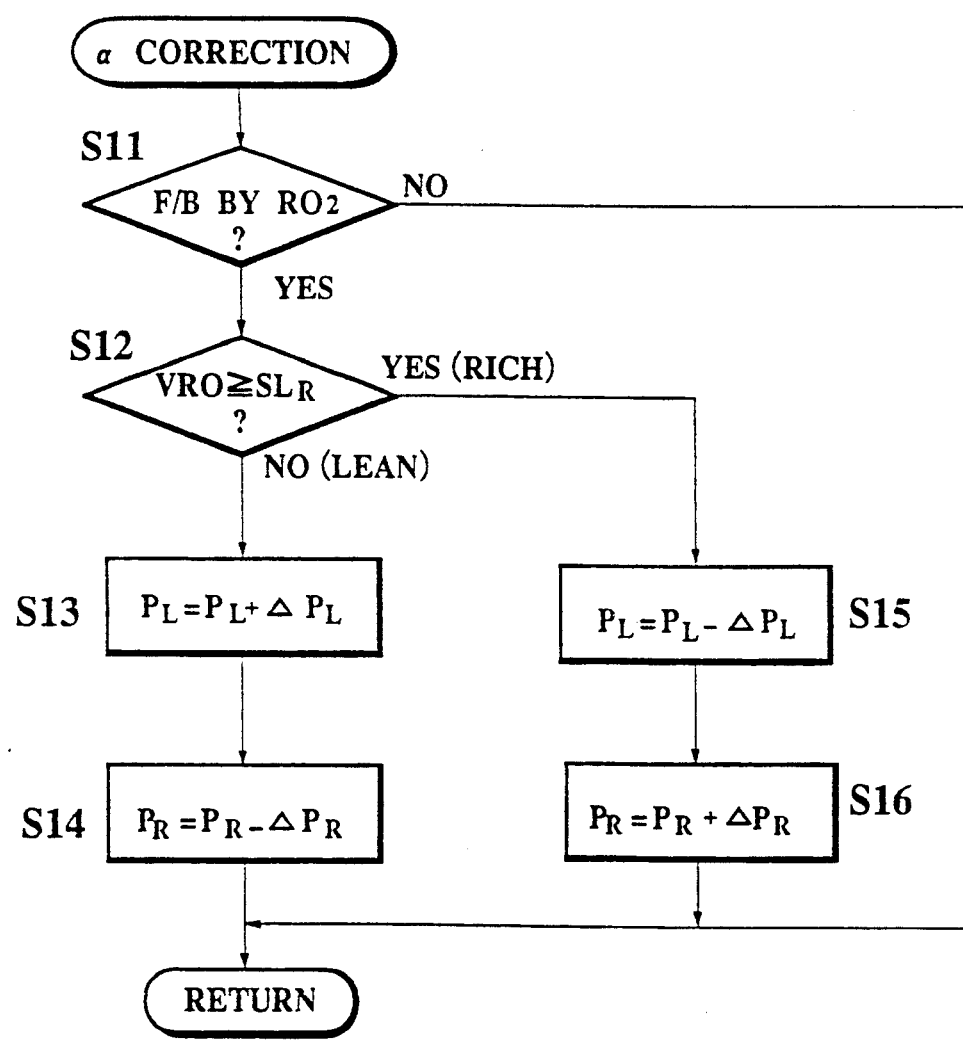
FIG. 1B is a flowchart for assistance in explaining a prior-art routine for correcting the air fuel ratio feedback correction coefficient $\alpha$ calculated on the basis of the front $O_2$ sensor output VFO, further on the basis of the rear $O_2$ sensor output VRO.
Figure 1C:
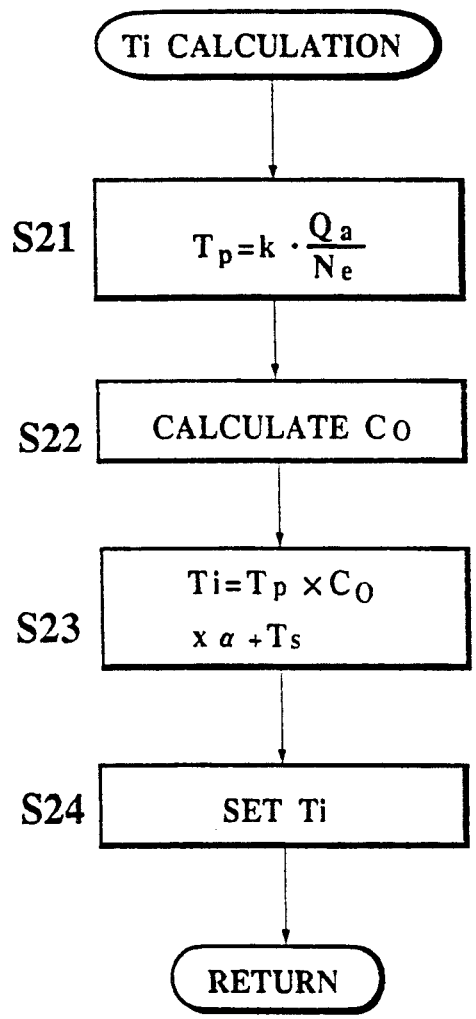
FIG. 1C is a flowchart for assistance in explaining a prior-art routine for calculating the fuel injection pulse width Ti.
Figure 5:
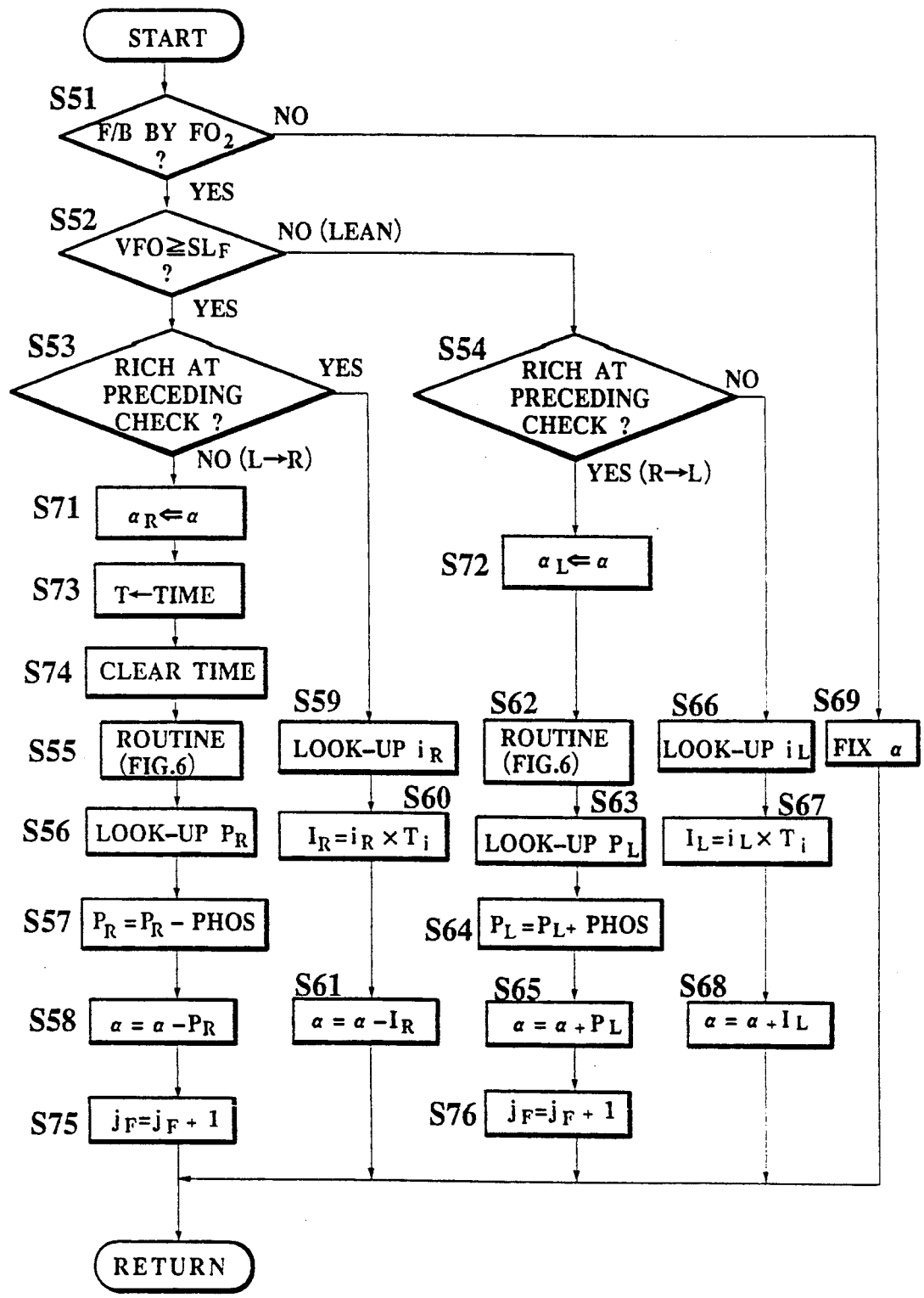
FIG. 5 is a flowchart for assistance in explaining a routine for calculating the air fuel ratio feedback correction coefficient $\alpha$ on the basis of the front $O_2$ sensor output VFO according to the present invention.
Figure 6:
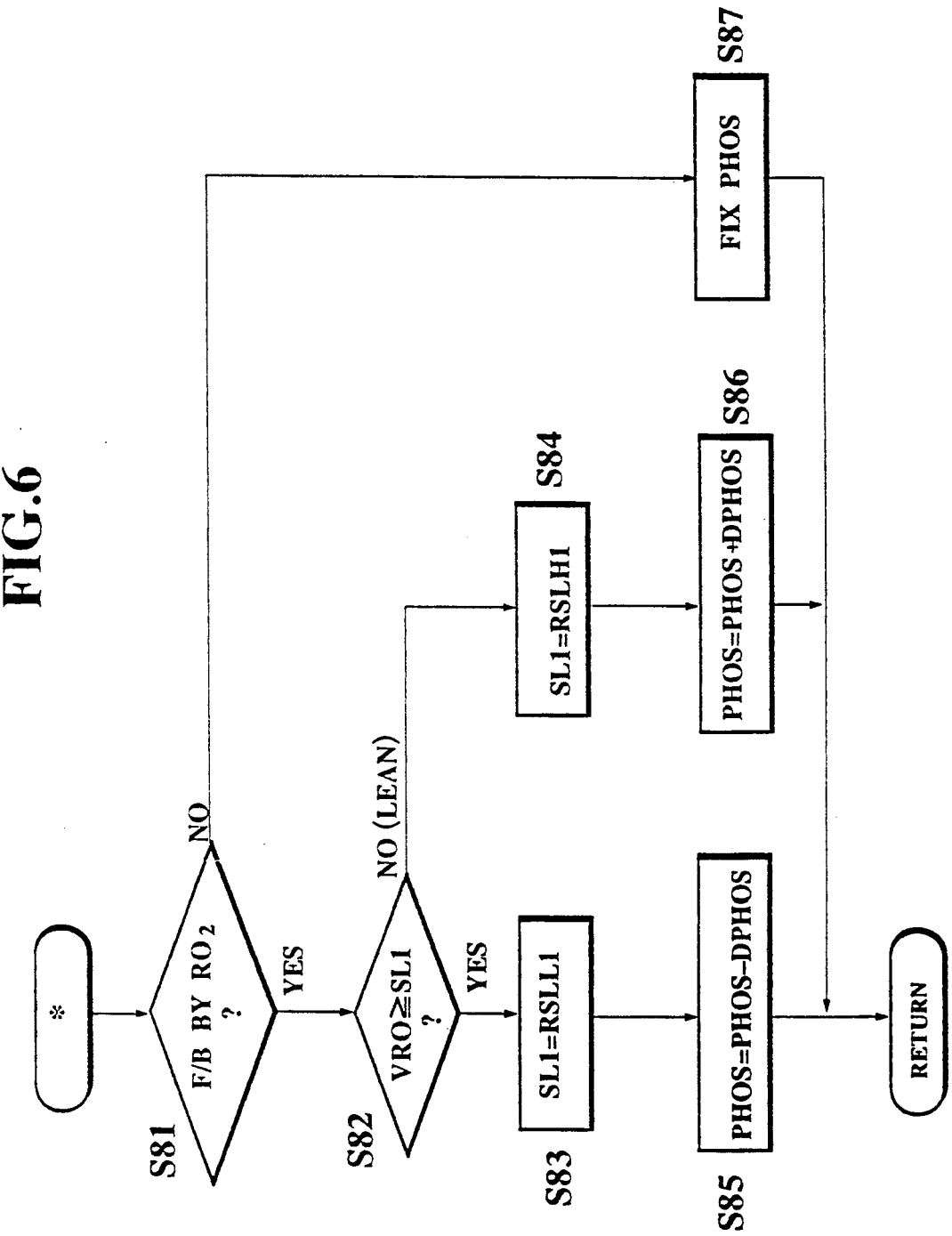
FIG. 6 is a flowchart for assistance in explaining a routine for calculating a correction value PHOS of the basic control constant according to the present invention.
Figure 7:
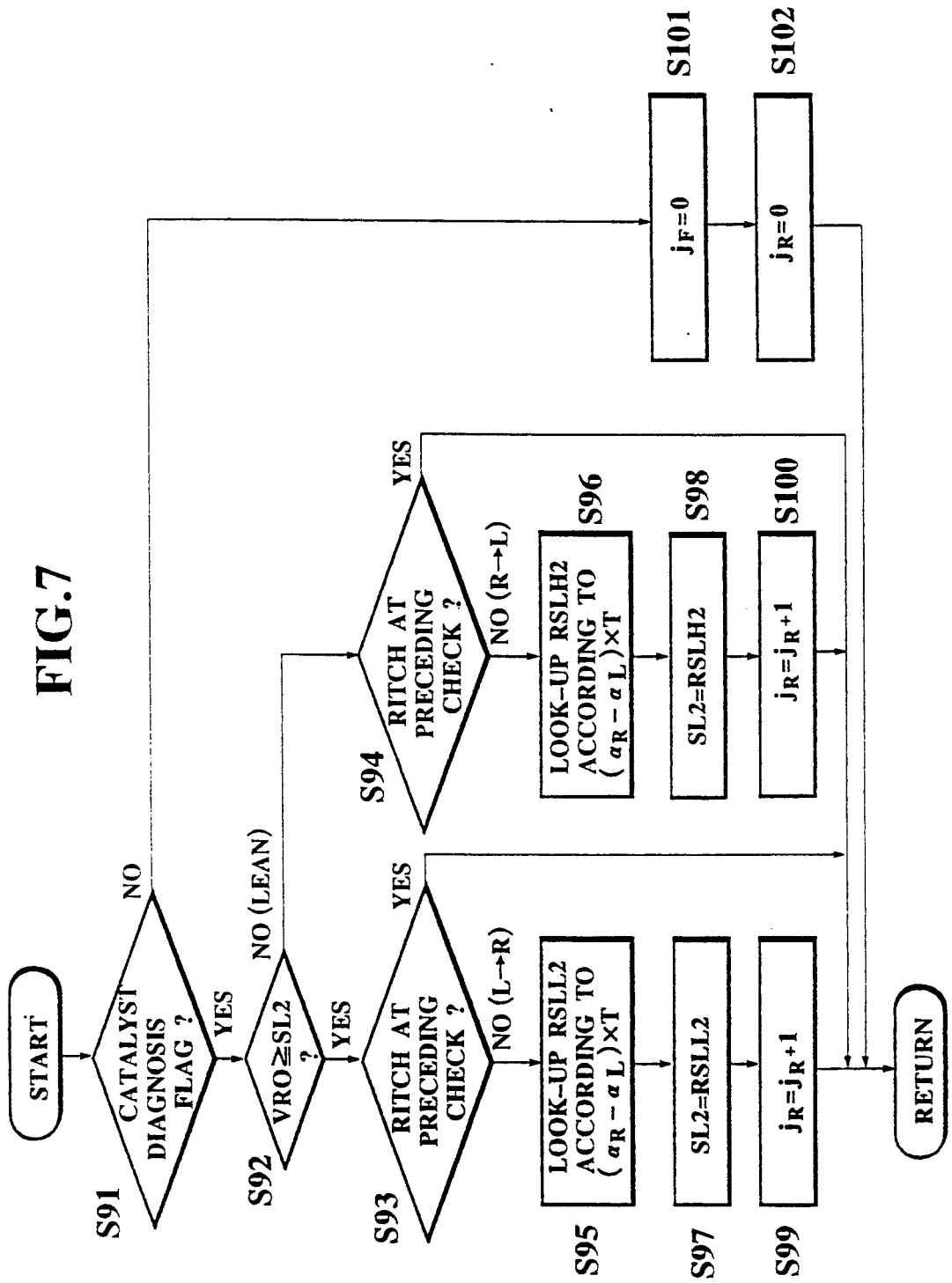
FIG. 7 is a flowchart for assistance in explaining a routine for setting catalyst degradation diagnosing slice levels SL2 in addition to the air fuel ratio feedback controlling slice levels SL1 and for counting the number of inversions of the rear $O_2$ sensor output VRO across the slice level SL2.
Figure 8:
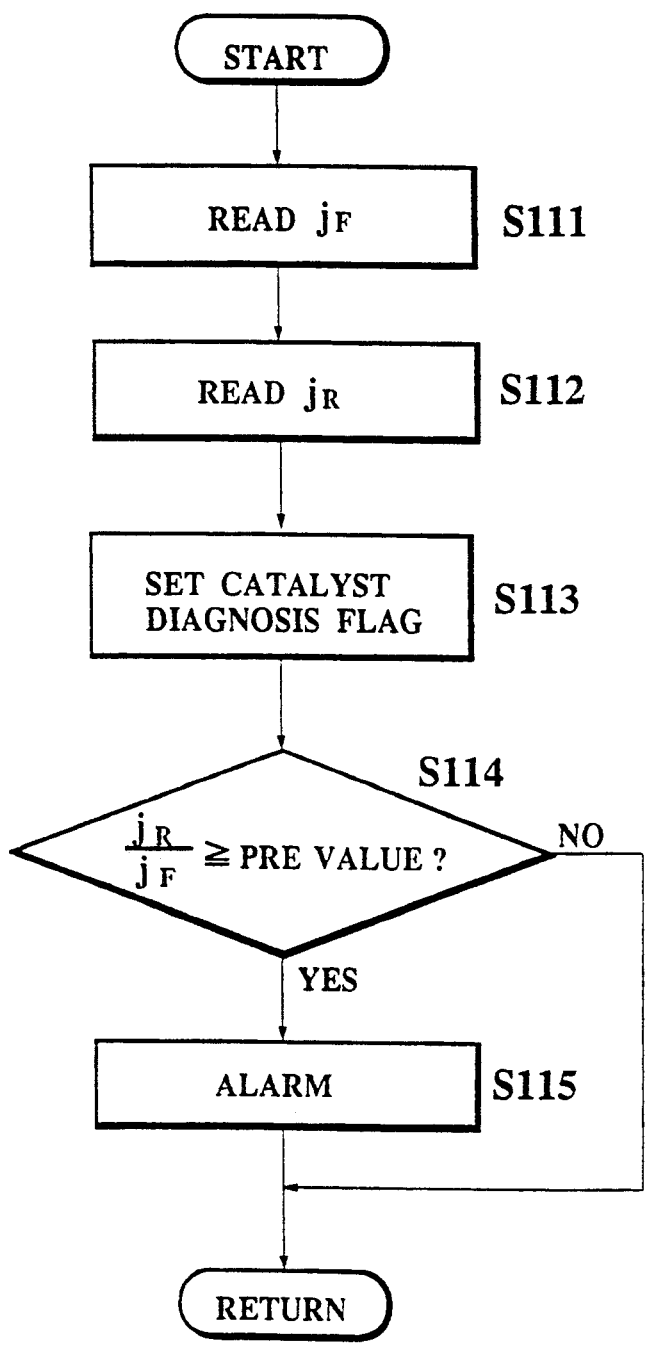
FIG. 8 is a flowchart for assistance in explaining a routine for diagnosing catalyst degradation on the basis of the measured number of inversions.

In the above-mentioned composing elements shown in FIGS. 2A and 2B, the basic fuel injection amount calculating means 33 corresponds to the step S21 shown in FIG. 1C; the fuel injection amount determining means 41 corresponds to the steps 22 and 23 shown in FIG. 1C; the inversion discriminating means 35 corresponds to the steps S52, S53 and S54 shown in FIG. 5; the basic control constant determining means 36 corresponds to the steps S56, S59, S63 and S66 shown in FIG. 5; the rich/lean discriminating means 39 corresponds to the step S82 shown in FIG. 6; the air fuel ratio feedback correction coefficient determining means 40 corresponds to the steps S58, S61, S65, S68, S57 and S64 shown in FIG. 5; the period measuring means 47 corresponds to the step 73 shown in FIG. 5; the amplitude measuring means 48 corresponds to the steps S71 and S72 shown in FIG. 5; the catalyst degradation diagnosing slice level setting means 49 corresponds to the steps S91 to S102 shown in FIG. 7; and the catalyst degradation discriminating means 45 corresponds to the steps S111 to S114 shown in FIG. 8, repectively as described in further detail later.

Figure 3:
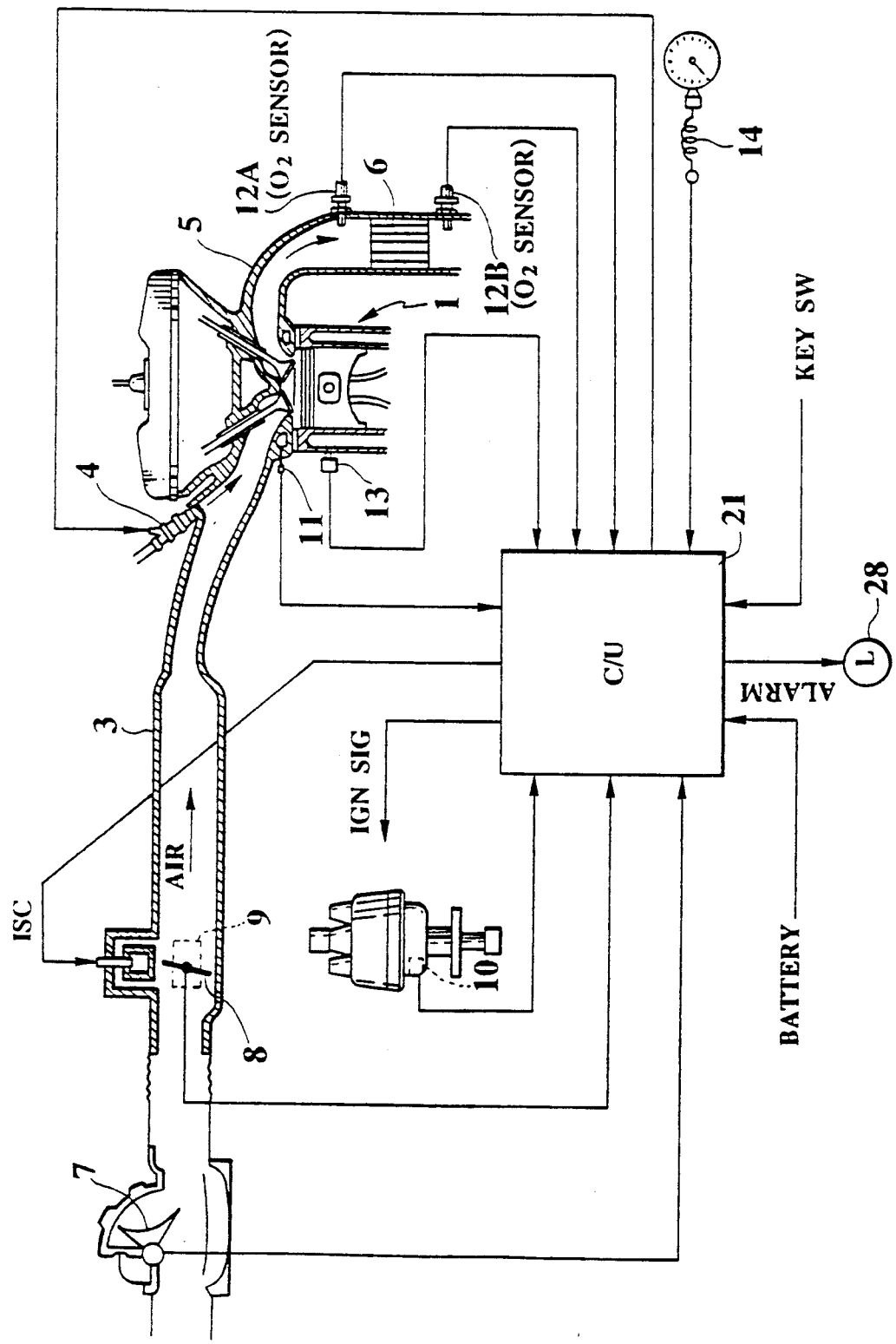
FIG. 3 is an illustration showing a practical control system of the embodiment of the present invention.

FIG. 3 is an engine system diagram to which the embodiment of the present invention is applied. In FIG. 3, intake air is introduced into a cylinder of an engine 1 from an air cleaner via an intake pipe 3, and fuel is injected into an intake port of the engine 1 from a fuel injector 4 activated in response to an injection signal applied by a control unit 21. Gas burnt within the cylinder is introduced into a catalytic converter 6 disposed on the downstream side of an exhaust pipe 5 so that harmful gas (CO, HC, $NO_X$) included in the combustion gas is purified by catalytic converter rhodium before being exhausted.

The amount Qa of intake air is detected by an air flow meter 7, and controlled by a throttle valve 8 linked with an accel pedal. Engine speed Ne is detected by a crank angle sensor 10, and coolant temperature Tw of a water jacket is detected by a temperature sensor 11.

A front air fuel ratio (e.g. $O_2$) sensor 12A is disposed on the upstream side of the catalytic converter 6 provided in the exhaust pipe, and a rear air fuel ratio (e.g. $O_2$) sensor 12B is disposed on the downstream side of the catalyst converter 6. Both the sensors 12A and 12B are provided with such characteristics that the output voltage changes abruptly with the stoichiometric (theoretical) mixture ratio as a border so as to outputs of binary signals indicative of that mixture is on the rich side or the lean side in comparison with the theoretical air fuel ratio, respectively. Further, without being limited to the $O_2$ sensors, wide-range air fuel ratio sensors or lean sensors can be used instead of the $O_2$ sensors.

The engine system is further provided with an opening rate sensor 9 for detecting a throttle valve 8, a knock sensor 13, and a vehicle speed sensor 14.

The output signals of the air flow meter 7, the crank angle sensor 10, the coolant temperature sensor 11, two $O_2$ sensors 12A and 12B, etc. are all inputted to a control unit 21. The control unit 21 outputs the fuel injection signal to the injector 4, and an alarm signal to an indicator lamp 28 arranged in the vehicle room when catalyst within the catalytic converter is degraded beyond a predetermined limit.

Figure 4:
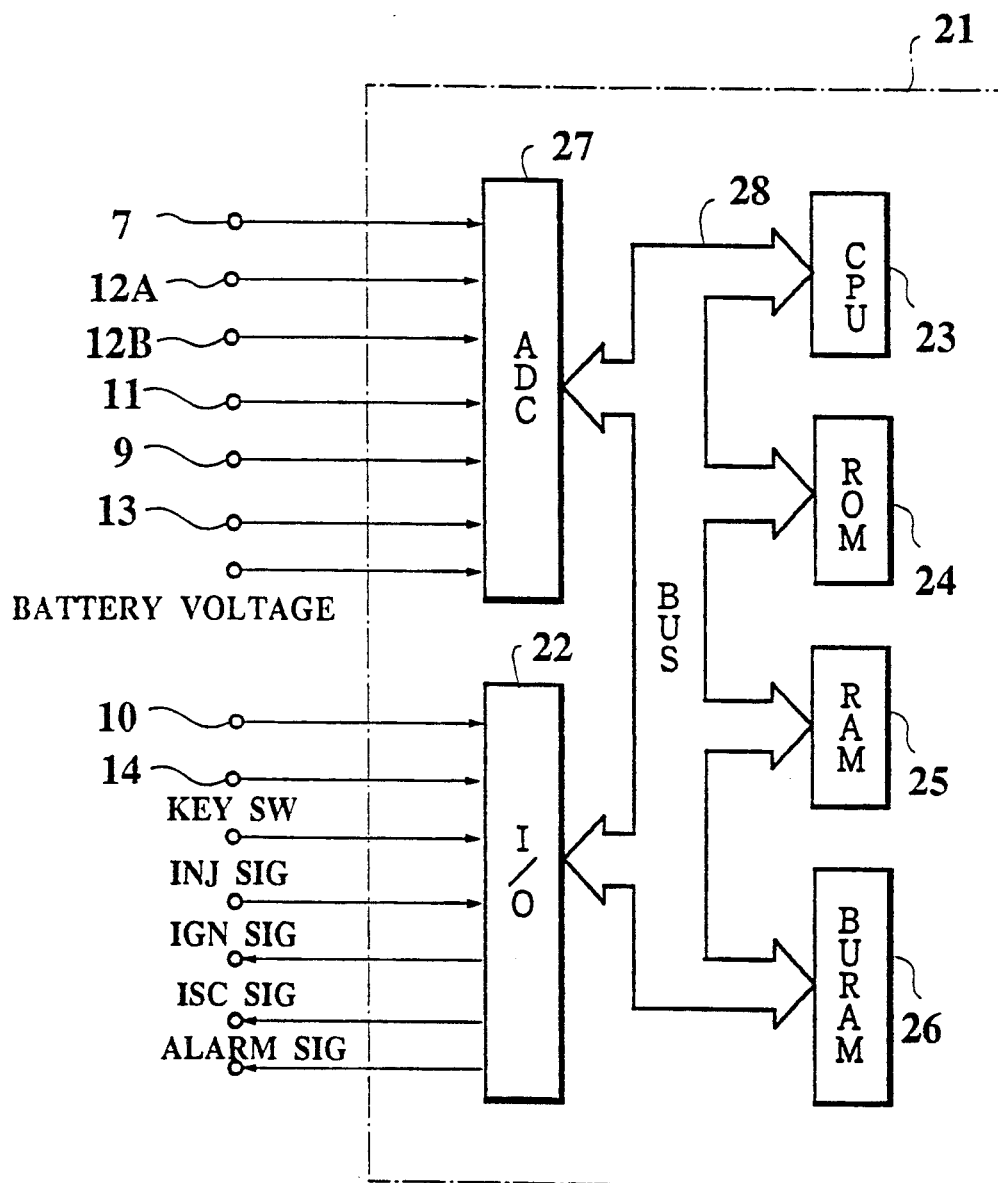
FIG. 4 is a block diagram showing a control unit of the embodiment shown in FIG. 3.

FIG. 4 is a block diagram showing the control unit 21 composed of an I/O port 22, a CPU 23, a ROM 24, a RAM 25, a BURAM (buffer random access memory) 26, an A-D converter 27, and a bus 28. The analog output signals of the air flow meter 7, the $O_2$ sensors 12A and 12B, the temperature sensor 11, the throttle valve opening rate sensor 9, the knock sensor 13 are all applied to the CPU 23, RAM 25 or BURAM 26 via the A-D converter 27. On the other hand, the digital output signals of the crank angle sensor 10, and vehicle speed sensor 14 are applied thereto via the I/O port 22. Further, an injection signal, an ignition signal, an ISC (integrated storage control) signal, and an alarm signal to the lamp 28 are outputted therefrom via the I/O port 22. The I/O port 22 functions as the outputting means 42.

The CPU 23 of the control unit 21 controls the air fuel ratio in feedback loop manner in accordance with the procedure shown in FIGS. 5 and 6, and further diagnoses catalyst degradation in accordance with the procedure shown in FIGS. 7 and 8.

FIG. 5 shows a routine for feedback controlling the air fuel ratio on the basis of the output voltage signal VFO of the front $O_2$ sensor 12A, which is executed in synchronism with engine revolution.

The steps S52 to S54 correspond to the function of the inversion discriminating means 35 shown in FIGS. 2A and 2B. That is, control discriminates whether the front $O_2$ sensor output VFO is inverted to the rich side or the lean side with the slice level $SL_F$ corresponding to the stoichiometric mixture ratio as a border, by comparing the sensor output VFO with the slice level.

In more detail, control first checks whether air fuel ratio feedback condition F/B is established by the front $O_2$ sensor $FO_2$ (in step S51). If NO, control proceeds to step S69 to fix the air fuel ratio feedback correction coefficient $\alpha$. The non-established feedback conditions are low coolant temperature condition, engine start (or immediately after engine start) condition, engine warming-up condition, no fuel condition, etc. If YES in step S51, control compares the front $O_2$ sensor output voltage VFO with a slice level $SL_F$ corresponding to the stoichiometric mixture ratio and determines that the air fuel ratio is on the rich side if $VFO \geq SL_F$ and on the lean side if $VFO < SL_F$ (in step S52). Further, control checks again whether the air fuel ratio is rich at the proceeding check (in steps S53 and S54).

The steps S71 and S72 correspond to the functions of the amplitude measuring means 48, and the step S73 corresponds to the function of the period measuring means 47 both shown in FIG. 2B.

Figures 1, 1E:
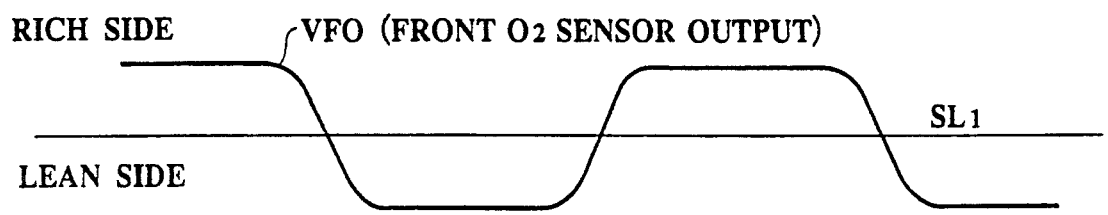
FIGS. 1E-1 and 1E-2 are waveform diagrams showing the front (upstream side) $O_2$ sensor output voltage VFO and the air fuel ratio feedback correction coefficient $\alpha$, respectively.
Figures 1, 1E, 2:
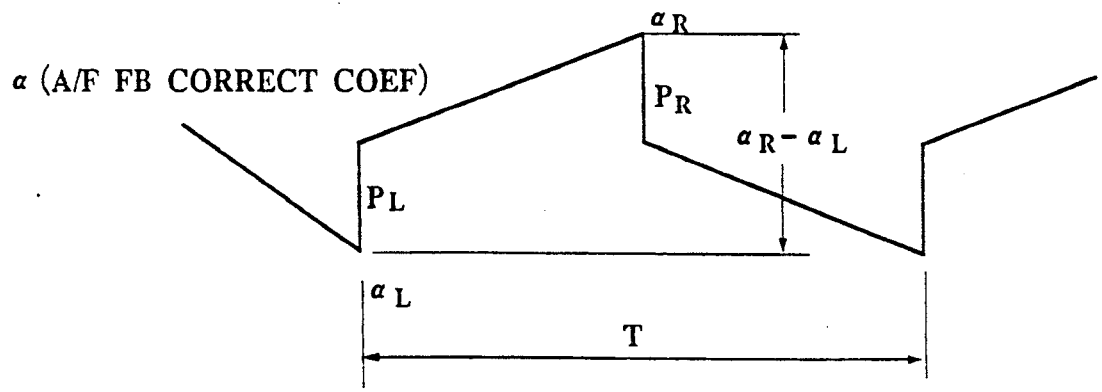

In more detail, if NO (lean→rich) in step S53, the current air fuel ratio feedback correction coefficient $\alpha$ is substituted for a variable $\alpha_R$ (in step S71), and the current timer value is substituted for a variable T (in step S73). This timer starts to count time after once cleaned (in step S74). Therefore, the timer value substituted for the variable T represents one period of $\alpha$. The variable T indicative of a period of $\alpha$ is shown in FIG. 1E-2. Thereafter, a routine (as shown in FIG. 6) is executed to calculate a correction value PHOS of the basic control constant (in step S55).

On the other hand, if YES (rich→lean) in step S54, the correction coefficient $\alpha$ is substituted for $\alpha_L$ (in step S72) and the routine (shown in FIG. 6) is immediately executed to calculate a correction value PHOS of the basic control constant (in step S62).

In the above steps, since control proceeds to step S71 immediately after the front $O_2$ sensor output VFO changes from the lean to the rich, the value substituted for the variable $\alpha_R$ indicates the maximum value of $\alpha$ within one period and further the value substituted for the variable $\alpha_L$ indicates the minimum value of $\alpha$ within one period, both as shown in FIG. 1E-2. Therefore, the value $(\alpha_R - \alpha_L)$ denotes the amplitude of the variable $\alpha$ also as shown in FIG. 1E-2.

The steps S56, S59, S63 and S66 correspond to the function of the basic control constant determining means 36 shown in FIGS. 2A and 2B. That is, control reads a proportion map value $P_R$ or $P_L$ (in step S56 or S63) or an integration map value $i_R$ or $i_L$ (in step S59 or S66) according to the check results and with reference to maps (in accordance with table look-up method), and stores the read value in a register of the CPU. These map values $P_R$, $P_L$, $i_R$, $i_L$ are predetermined basic control constants for feedback controlling the air fuel ratio.

Further, with respect to the integration value, a final integration value $I_R$ or $I_L$ is obtained by multiplying the map value $i_R$ or $i_L$ by engine load (e.g. fuel injection pulse width Ti) as follow (in steps S60 and S67):

$$I_R = i_R \times Ti \qquad (1)$$

$$I_L = i_L \times Ti \qquad (2)$$

In the above calculation, it is also possible to use Tp+OFST instead of Ti, where Tp denotes the basic injection pulse width and OFST is an offset value.

The reason why the above-mentioned engine load correction is necessary is as follows: since the amplitude of the air fuel ratio feedback correction coefficient $\alpha$ increases under the engine operating condition where the period of $\alpha$ becomes long, so that the exhaust gas purification performance by catalytic converter rhodium is deteriorated. Therefore, it is preferable to keep the $\alpha$'s amplitude roughly costant, irrespective of the $\alpha$'s period.

The steps S58, S61, S65, S68, S57 and S64 correspond to the function of the air fuel ratio feedback correction coefficient $\alpha$ determining means 40 shown in FIGS. 2A and 2B.

Control reads the correction value PHOS determined on the basis of the rear O₂ sensor output VRO and stored in the register of the CPU, and corrects the correction value PHOS by the proportion map value $P_R$ or $P_L$ as follows (in steps S57 and S64):

$$P_R = P_R - PHOS \qquad (3)$$

$$P_L = P_L + PHOS \qquad (4)$$

Owing to the above correction, it is possible to correct an offset of the air fuel ratio from the stoichiometric mixture ratio to either of rich or lean side by this correction value PHOS when the air fuel ratio is feedback controlled on the basis of the front O₂ sensor output VFO.

Control determines the air fuel ratio feedback correction coefficient $\alpha$ on the basis of the values $P_R$, $P_L$, $I_R$ or $I_L$ (in steps S58, S61, S65 or S68) and increments the counter value $j_F$ indicative of the number of inversions of the front O₂ sensor output VFO across the slice level $SL_F$ (in step S75 or S76), as described later again.

FIG. 6 shows a routine (executed in steps S55 and S62 shown in FIG. 5) for calculating a correction value PHOS of the basic control constant, which is executed whenever the front O₂ sensor output VFO is inverted.

The step S82 corresponds to the rich/lean discriminating means 38 shown in FIGS. 2A and 2B. The steps S85 and S86 correspond to the correct value calculating means 39 shown in FIGS. 2A and 2B.

Control checks whether air fuel ratio feedback condition F/B is established by the rear O₂ sensor RO₂ (in step S81). If NO, control proceeds to step S87 to fix the basic control constant correction value PHOS. If YES in step S81, control compares the rear O₂ sensor output VRO with a slice level SL1 (corresponding to a stoichiometric mixture ratio) for feedback controlling the air fuel ratio (in step S82). If YES (VRO≧SL1) (rich), control proceeds to steps S83 and S85. On the other hand, if NO (VRO<SL1) (lean), control proceeds to steps S84 and S86.

Figure 9A:
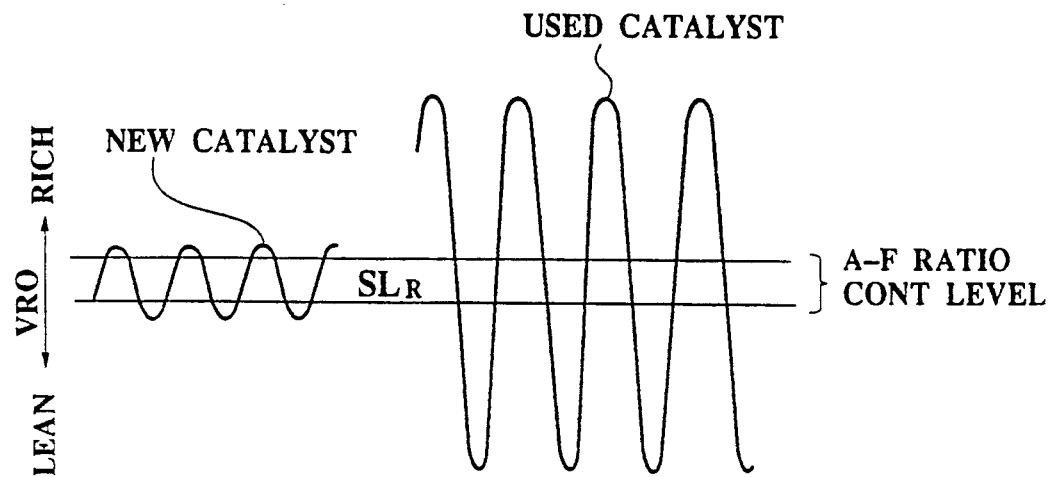
FIG. 9A and 9B are waveform diagram showing the rear $O_2$ sensor output voltages, for assistance in explaining the operation of the embodiment.
Figure 9B:
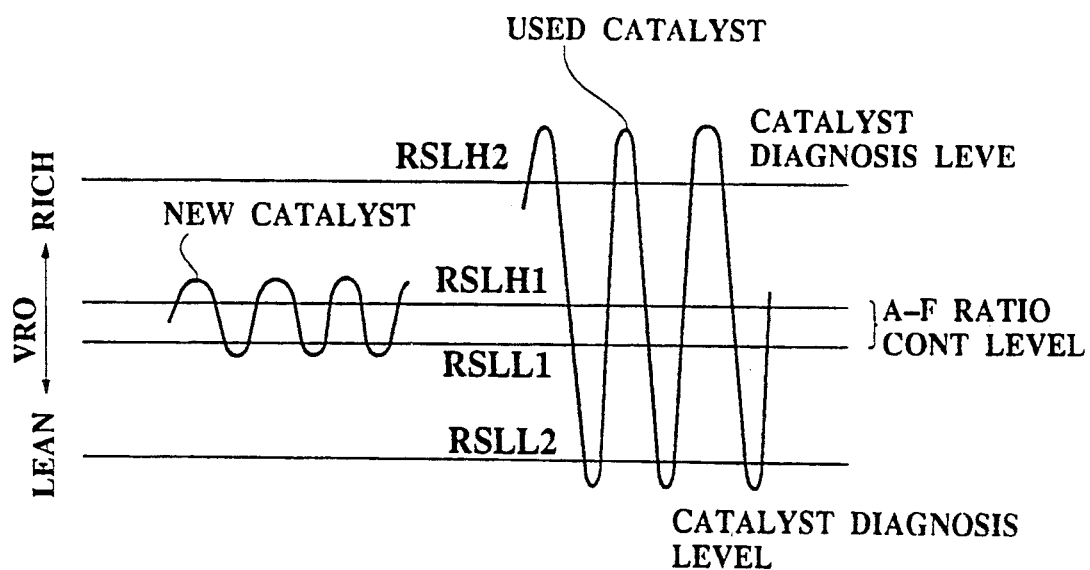

Fixed values RSLL1 and RSLH1 (RSLL1<RSLH1) are substituted for the slice level SL1 (in steps S83 and S84), where RSLL1 denotes the lean discriminating slice level and RSLH1 denotes the rich discriminating slice level both for feedback controlling the air fuel ratio and a difference (RSLH1−RSLL1) between the two denotes the hysteresis width. That is, the slice level SL1 for feedback controlling the air fuel ratio is provided with hysteresis characteristics, as shown in FIG. 9B.

Control reads a variable PHOS and further updates the read variable as follows (in step S85):

$$PHOS = PHOS - DPHOS \qquad (5)$$

where the initial value of the variable PHOS is 0.

The updated value of the variable PHOS becomes a correction value. In the above expression (5), DPHOS denotes the updated width and this updated width DPHOS is subtracted from the PHOS due to the following reason: when control proceeds to step S85, since control discriminates that the air fuel ratio is on the rich side, the air fuel ratio must be returned to the lean side. For this purpose, $P_R$ (shown in step S58) must be increased and $P_L$ (shown in step S65) must be decreased. However, since the correction value PHOS is expressed in the form of the above expression (3) or (4), the PHOS is decreased to increase $P_R$ and further to decrease $P_L$.

Similarly, control reads a variable PHOS and further updates the read variable as follows (in step S86):

$$PHOS = PHOS + DPHOS \qquad (6)$$

In summary, the positive and negative signs attached to the updated width DPHOS in the expressions (5) and (6) are determined on the basis of the rich/lean discrimination results on the basis of the rear O₂ sensor output VRO executed in step S82.

Further, in order to return the air fuel ratio to the lean side, it is not necessarily change both $P_R$ and $P_L$. That is, the air fuel ratio can be returned to the lean side by increasing $P_R$ or decreasing $P_L$.

Returning to FIG. 5 again, the steps S58, S61, S65 and S68 correspond to the function of the air fuel ratio feedback correction coefficient determining means 40 shown in FIGS. 2A and 2B, together with the steps S57 and S64. In these steps, the air fuel ratio feedback correction coefficient $\alpha$ is determined on the basis of the proportional value $P_R$, $P_L$ corrected on the basis of the correction value (variable) PHOS and the integrated value $I_R$, $I_L$ corrected on the basis of the engine load.

The correction coefficient $\alpha$ obtained as described above is used to determine the fuel injection pulse width Ti in accordance with the procedure already explained with reference to FIG. 1C. In FIG. 1C, the step S21 corresponds to the function of the basic fuel injection amount calculating means 33; and the steps S22 and S23 correspond to the function of the fuel injection amount determining means 41 both shown in FIGS. 2A and 2B.

The counter value $j_F$ indicative of the number of inversions of the front O₂ sensor output VFO (across the slice level $SL_F$) is incremented (in steps S75 and S76).

FIG. 7 shows a routine for determining a catalyst degradation diagnosing slice level SL2 in addition to an air fuel ratio feedback controlling slice level SL1. The number of inversions of the rear $O_2$ sensor output VRO across the slice level SL2 is measured by comparing the VRO with SL2.

In more detail, control checks whether the catalyst degradation diagnosing flag is set (in step S91). If YES, control proceeds to the succeeding steps to check whether the rear $O_2$ sensor output VRO is inverted with the catalyst degradation diagnosing slice level SL2 as a border (in steps S92, S93, S94), in the same way as in the steps S52 to S54 shown in FIG. 5.

Figure 12:
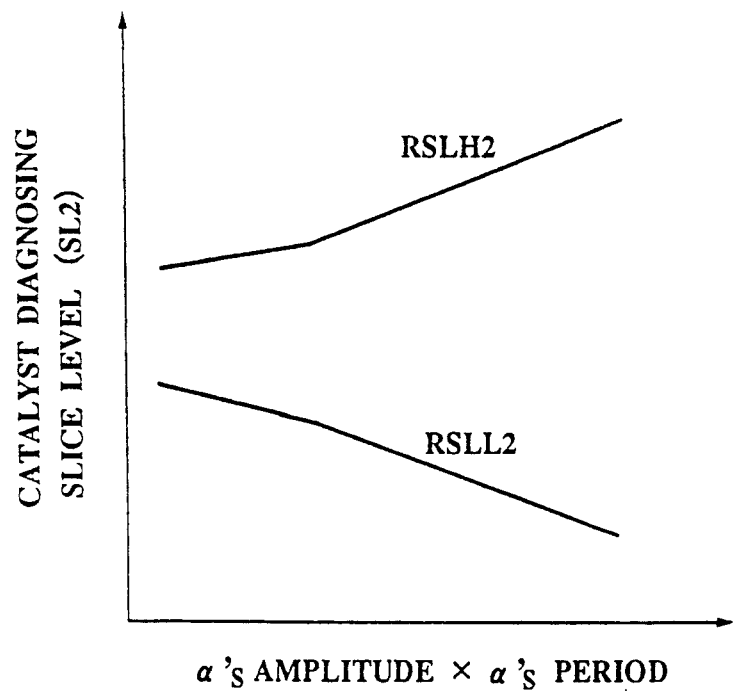
FIG. 12 is a graphical representation showing the relationship between the $\alpha$'s amplitude x $\alpha$'s period and the catalyst degradation diagnosing slice level of the embodiment.

If NO (lean→rich) in step S93, control determines a lean discriminating catalyst degradation diagnosing slice level RSLL2 according to $(\alpha_R - \alpha_L) \times T$ and with reference to a map as shown in FIG. 12, where ($\alpha_R - \alpha_L$) denotes the $\alpha$'s amplitude and T denotes the $\alpha$'s period (in step S95). In the same way, if NO (rich→lean) in step S94, control determines a rich discriminating catalyst degradation diagnosing slice level RSLH2 according to $(\alpha_R - \alpha_L) \times T$ and with reference to the same map (in step S96).

The map shown in FIG. 12 indicates that the rich determining slice level RSLH2 increases with increasing product of $\alpha$'s amplitude and $\alpha$'s period, but the lean determining slice level LSLL2 decreases with increasing product of $\alpha$'s amplitude and $\alpha$'s period.

The above steps S95 and S96 correspond to the functions of the catalyst degradation diagnosing slice level determining means 49 shown in FIG. 2B.

Control substitutes the lean determining catalyst diagnosing slice level RSLL2 for the slice level SL2 (in step S97) and the rich determining catalyst diagnosing slice level RSLH2 (RSLH2>RSLL2) for the slice level SL2 (in step S98), in order to provide hysteresis for the slice level SL2. The relationship between the catalyst degradation diagnosing slice level SL2 and the air fuel ratio feedback controlling slice level SL1 is shown in FIG. 9B as RSLH2>RSLH1 and RSLL2<RSLL1. Here, the first character R denotes the rear sensor; the second and third characters SL denote a slice level; the fourth character H or L denotes the rich side or lean side; and the fifth character 1 or 2 indicates air fuel ratio control or catalyst diagnosis, respectively.

Control increments the counter values $j_R$ (in steps S99 and S100). This counter value $j_R$ indicates the number of inversions of the rear $O_2$ sensor output VRO (the sum total of the number of times that VRO increases beyond RSLH2 or decreases below RSLL2). Further, if NO (in step 91), since no catalyst degradation diagnosing flag is set, control clears the two counter values $j_F$ and $j_R$ (in steps S101 and S102).

FIG. 8 shows a routine for diagnosing the catalyst degradation on the basis of the measured number of inversions of the front and rear $O_2$ sensors across the slice levels, which corresponds to the function of the catalyst degradation discriminating means 45 shown in FIGS. 2A and 2B, in cooperation with the steps S75, S76 and S99 to S102 shown in FIGS. 5 and 7.

Control reads two counter values $j_F$ and $j_R$ (in steps S111 and S112), where $j_F$ denotes the number of inversions of the front $O_2$ sensor and $j_R$ denotes the number of inversions of the rear $O_2$ sensor. Control checks whether the engine is operating in the steady state and sets the catalyst degradation diagnosis flag (in step S113). Control resets the flag if the engine is not in the steady state. This flag is the same as that shown in step S91 in FIG. 7.

Control compares a ratio of the two counter values $j_R/j_F$ with a predetermined value (1 or less) (in step S114). This ratio $j_R/j_F$ represents the degree of catalyst degradation. For instance, when the catalyst is new, $j_R/j_F=0$. However, when the catalyst is degraded and therefore the period of the rear $O_2$ sensor output VRO coincides perfectly with the period of the front $O_2$ sensor output VFO, $j_R/j_F=1$. Therefore, it is possible to discriminate that the catalyst has been degraded if $j_R/j_F$ is equal to or more than a predetermined value. In this step S114, it is also possible to discriminate that the catalyst has been degraded if $j_R$ equal to or more than a predetermined value, by simply comparing the number ($j_R$) of inversions of the rear $O_2$ sensor output VRO with a predetermined value. The precision of the degradation analysis of this simple method is low as compared with the comparison of $j_R/j_F$ with a predetermined value.

If YES in step S114, control outputs an alarm signal to an indicator lamp 28 arranged in front of the driver seat to turn it on, so that the driver can know the catalyst degradation. Further, it is also possible to use this signal for self-diagnosis.

The function of the above embodiments will be described hereinbelow.

In general, the period of the rear $O_2$ sensor output VRO decreases gradually as the catalyst degrades, and approaches the period of the front $O_2$ sensor output VFO. Conventionally, therefore, the rear $O_2$ sensor output VRO is compared with two slice levels, and the catalyst is determined to be degraded when the number of inversions of the rear $O_2$ sensor output VRO across the slice level exceeds a predetermined value.

In this case, however, where the same slice level is used for both the catalyst degradation diagnosing slice level and the air fuel ratio feedback controlling slice level as in the prior-art method, since the rear $O_2$ sensor output also fluctuates due to small air fuel ratio fluctuation caused when the air fuel ratio is PI (proportional and integrated) controlled in response to the front $O_2$ sensor output VFO under condition that the rear $O_2$ sensor output VRO is near the slice level, there exists a problem in that the air fuel ratio fluctuations are inevitably counted as the number of inversions of the front $O_2$ sensor output VFO, thus deteriorating the reliability of the catalyst degradation diagnosis.

To overcome the above problem, in the present invention, as shown in FIG. 9B, the rich discriminating slice level for diagnosing catalyst degradation RSLH2 (where R denotes the rear $O_2$ sensor; SL denotes the slice level; H denotes the rich side; and 2 denotes the catalyst diagnosis) is set higher than the rich discriminating slice level for feedback controlling air fuel ratio RSLH1 (where 1 denotes the air fuel ratio control) and further the lean discriminating slice level for diagnosing catalyst degradation RSLL2 (where L denotes the lean side) is set lower than the lean discriminating slice level for feedback controlling air fuel ratio RSLL1. In this case, since the amplitude of the rear $O_2$ sensor output VRO fluctuates violently after the catalyst has been degraded as compared with the new catalyst, it is possible to measure the inversions of the rear $O_2$ sensor output VRO across the slice levels only after the catalyst has been degraded, thus discriminating the measurement of the new catalyst from that of the used catalyst.

In the catalyst degradation, however, since the amplitude of the rear $O_2$ sensor output VRO changes according to the engine operating condition, there exists a problem in that erroneous diagnosis occurs if the catalyst degradation diagnosing slice levels RSLH2 and RSLL2 are fixed values.

For instance, even if the rich discriminating slice level RSLH2 is determined sufficiently high beyond the ordinary rear $O_2$ sensor output VRO, there exists the case where VRO exceeds the RSLH2 because the amplitude of VRO increases under high speed and large load engine operating conditions. In this case, therefore, the catalyst is erroneously discriminated to be degraded, in spite of the fact that the catalyst is not yet degraded. In contrast, when VRO exceeds RSLH2 and therefore the catalyst is discriminated to be degraded, if the engine operating condition changes to a condition that the air fuel ratio feedback correcting coefficient $\alpha$ becomes smaller, since the amplitude of VRO decreases below RSLH2, the used catalyst is not discriminated to be degraded.

Figure 10:
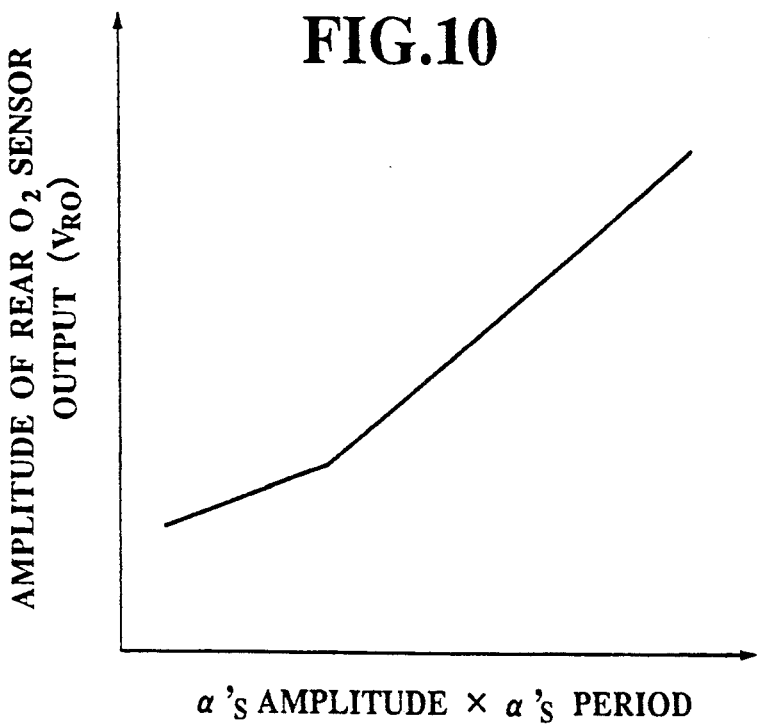
FIG. 10 is a graphical representation showing the relationship between the $\alpha$'s amplitude x $\alpha$'s period and the amplitude of the rear $O_2$ sensor output of the embodiment.

To overcome the above-mentioned problem, in the present invention, the RSLH2 and RSLL2 are both set as variables. In more detail, the amplitude and the period of the air fuel ratio feedback correcting coefficient $\alpha$ vary according to engine operating conditions, because the delay time of the control system varies according to engine speed and engine load. Further, the amplitude of the rear $O_2$ sensor output VRO increases with increasing product of $\alpha$'s amplitude and $\alpha$'s period in the case of the same catalyst, as shown in FIG. 10. The reason is as follows: when the product of $\alpha$'s amplitude and $\alpha$'s period increases, since the fluctuation in air fuel ratio due to the feedback control on the basis of the front $O_2$ sensor output increases, the amplitude of the rear $O_2$ sensor output VRO also increases due to the above influence.

Figure 11:
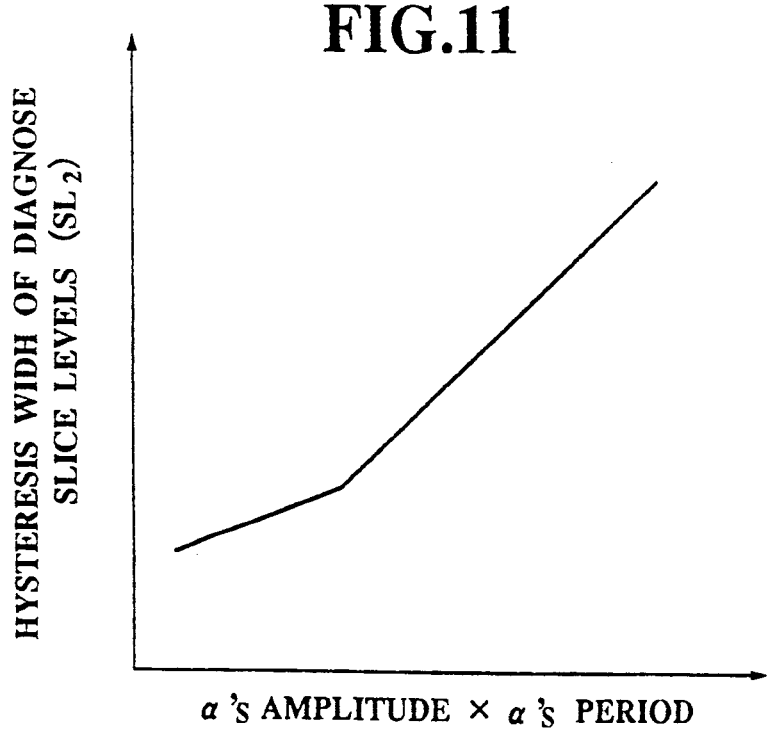
FIG. 11 a graphical representation showing the relationship between the $\alpha$'s amplitude x $\alpha$'s period and the hysteresis width of the diagnosing slice levels of the embodiment.

Therefore, it is desirable that the diagnosing slice level SL2 is determined under due consideration of the product of $\alpha$'s amplitude and $\alpha$'s period so that the influence of the product of the two upon the amplitude of the rear $O_2$ sensor output VRO and the slice level SL2 can be cancelled each other. That is, in order to prevent erroneous diagnosis due to a difference in product of $\alpha$'s amplitude and $\alpha$'s period, it is necessary to determine the relationship between the hysteresis width (RSLH2−RSLL2) of the catalyst degradation diagnosing slice level SL2 and the product of the two as shown in FIG. 11, so as to become the same characteristics as shown in FIG. 10.

To obtain this relationship, the characteristics of the RSLH2 and RSLL2 with respect to the product of $\alpha$'s amplitude and $\alpha$'s period (engine operating conditions) are determined as shown in FIG. 12, respectively, as two different variables.

For instance, when the amplitude of the rear $O_2$ sensor output VRO increases at high engine speed and high engine load or when the period thereof increases at low engine speed and low engine load, since RSLH2 increases, so that the relative relationship between VRO and RSLH2 is kept constant, irrespective of engine operating conditions. Accordingly, if the catalyst is diagnosed as being degraded under small $\alpha$'s amplitude and period conditions, the same catalyst is also diagnosed as being degraded under large $\alpha$'s amplitude and period conditions. In contrast, if the catalyst is diagnosed as being not degraded under small $\alpha$'s amplitude and period conditions, the same catalyst is also diagnosed as being not degraded under large $\alpha$'s amplitude and period conditions.

Although the $\alpha$'s amplitude and the $\alpha$'s period vary according to engine speed and engine load, the catalyst diagnosing slice level is so determined that the relative relationship between VRO and SL2 will not change, thus improving the diagnosis reliability, without being subjected to the influence of the engine operating conditions.

Figure 13:
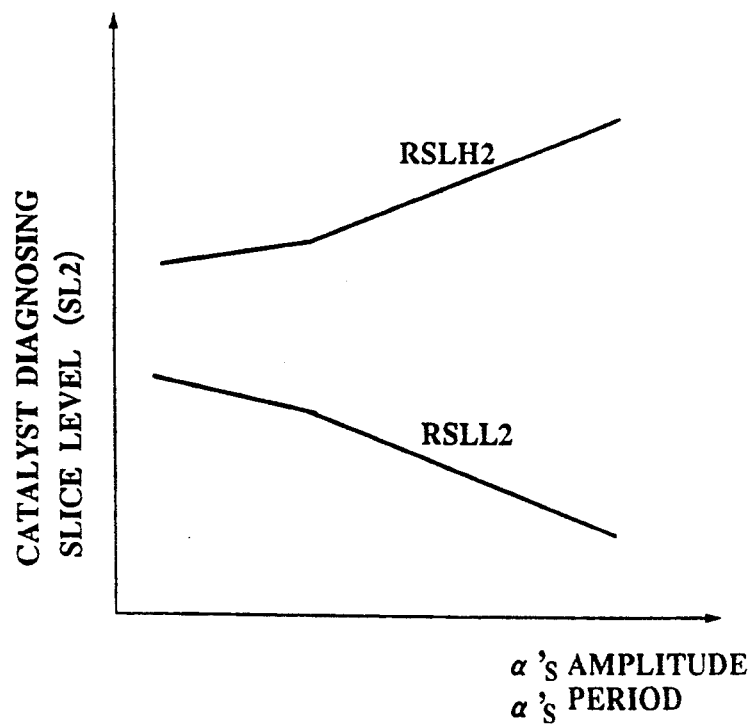
FIG. 13 is a graphical representation showing the relationship between the $\alpha'$ amplitude, $\alpha'$ period and the catalyst degradation diagnosing slice level of the embodiment.

FIG. 13 shows the relative relationship between $\alpha$'s amplitude or $\alpha$'s period and the catalyst degradation diagnosing slice level SL2. In comparison between the two method shown in FIGS. 12 and 13, the method shown in FIG. 12 is preferable from the standpoint of diagnosis precision, because there exist some cases where the amplitude of the rear $O_2$ sensor output VRO varies according to the $\alpha$'s period under the condition that the $\alpha$'s amplitude is constant. Further, the characteristics between the $\alpha$'s amplitude, the $\alpha$'s period and the catalyst degradation diagnosing slice level SL2 shown in FIGS. 12 and 13 correspond to the slice level determined by the slice level determining means 44 shown in FIG. 2A.

As described above, in the basic embodiment of the present invention shown in FIG. 2A, slice levels for diagnosing catalyst degradation are determined according to the engine operating conditions, in addition to the slice levels for feedback controlling air fuel ratio, thus improving the precision of catalyst degradation diagnosis without being subjected to the influence of engine operating conditions. Further, in the embodiment, shown in FIG. 2B, the rich discriminating slice level for diagnosing catalyst degradation is determined higher than the slice level for feedback controlling the air fuel ratio, and additionally the lean discriminating slice level for diagnosing catalyst degradation is determined lower than the slice level for feedback controlling the air fuel ratio, under due consideration of the amplitude and period of the air fuel ratio feedback correction coefficient, thus further improving the precision of catalyst degradation diagnosis.

What is claimed is:

1. A catalyst degradation diagnosing apparatus for an air fuel ratio control system, comprising:
   (a) operating condition sensing means for sensing engine operating conditions;
   (b) basic fuel amount calculating means for calculating a basic fuel amount according to the sensed engine operating conditions;
   (c) front air fuel ratio sensing means disposed upstream of a catalytic converter, for generating a front sensor signal;
   (d) rear air fuel ratio sensing means disposed downstream of the catalytic converter, for generating a rear sensor signal;
   (e) inversion discriminating means for discriminating whether the front sensor signal level is inverted to rich or lean side across a stoichiometric mixture ratio;
   (f) basic control constant determining means for determining a basic air fuel ratio feedback control constant on the basis of a result discriminated by said inversion discriminating means;
   (g) rich/lean discriminating means for discriminating whether the rear sensor signal level is on rich or lean side of an air fuel ratio feedback controlling slice level;
   (h) correction value calculating means for calculating a correction value of the basic control constant on the basis of a result discriminated by said rich/lean discriminating means;

(i) feedback correction coefficient determining means for determining an air fuel ratio feedback correction coefficient on the basis of the basic control constant corrected by the correction value;

(j) fuel injection amount determining means for determining a fuel injection amount by correcting the basic fuel injection amount by the air fuel ratio feedback correction coefficient;

(k) catalyst degradation diagnosing slice level determining means for determining a catalyst degradation diagnosing slice level according to the sensed engine operating conditions, in addition to the air fuel ratio feedback controlling slice level wherein the catalyst degradation diagnosing slice level comprises a reference value which is compared to the output of the rear air fuel ratio sensor to determine the degradation of the catalyst; and (l) catalyst degradation discriminating means for discriminating whether catalyst is degraded by comparing the rear sensor signal level with the catalyst degradation diagnosing slice level.

2. The catalyst degradation diagnosing apparatus for an air fuel ratio control system of claim 1, wherein said catalyst degradation diagnosing slice level determining means comprises:

(a) period measuring means for measuring a period of the air fuel ratio feedback correction coefficient $\alpha$ on the basis of the result discriminated by said inversion discriminating means;

(b) amplitude measuring means for measuring an amplitude of the air fuel ratio feedback correction coefficient $\alpha$ on the basis of the result discriminated by said inversion discriminating means; and (c) catalyst degradation diagnosing slice level setting means for setting a rich discriminating catalyst diagnosing slice level higher than a rich discriminating air fuel ratio feedback controlling slice level and a lean discriminating catalyst diagnosing slice level lower than a lean discriminating air fuel ratio feedback controlling slice level, in such a way that the rich discriminating catalyst diagnosing slice level increases and the lean discriminating catalyst diagnosing slice level decreases both with increasing any one of the measured period and amplitude of the air fuel ratio feedback correction coefficient.

3. The catalyst degradation diagnosing apparatus for an air fuel ratio control system of claim 2, wherein said catalyst degradation diagnosing slice level setting means sets a rich discriminating catalyst diagnosing slice level higher than a rich discriminating air fuel ratio feedback controlling slice level and a lean discriminating catalyst diagnosing slice level lower than a lean discriminating air fuel ratio feedback controlling slice level, in such a way that the rich discriminating catalyst diagnosing slice level increases and the lean discriminating catalyst diagnosing slice level decreases both with increasing product of the measured period and amplitude of the air fuel ratio feedback correction coefficient.

4. A method of diagnosing catalyst degradation in an air fuel ratio control system, comprising the steps of:

(a) detecting air fuel ratio upstream of a catalytic converter and outputting a front sensor signal corresponding thereto;

(b) detecting air fuel ratio downstream of the catalytic converter and outputting a rear sensor signal corresponding thereto;

(c) checking whether the front sensor signal output is inverter to rich or lean side across a stoichiometric mixture ratio;

(d) determining a basic air fuel ratio feedback control constant according to the rich or lean side;

(e) checking whether the rear sensor signal output is inverted to rich or lean side across an air fuel ratio feedback controlling slice level;

(f) calculating a correction value of the basic air fuel ratio feedback control constant according to the rich or lean side;

(g) determining an air fuel ratio feedback correction coefficient on the basis of the basic feedback control constant corrected by the correction value;

(h) measuring a period of the air fuel ratio feedback correction coefficient;

(i) measuring an amplitude of the air fuel ratio feedback correction coefficient;

(j) setting a rich discriminating catalyst diagnosing slice level higher than a rich discriminating air fuel ratio feedback controlling slice level and a lean discriminating catalyst diagnosing slice level lower than a lean discriminating air fuel ratio feedback controlling slice level in such a way that the rich discriminating catalyst diagnosing slice level increases and the lean discriminating catalyst diagnosing slice level decreases both with increasing any one of the measured period and amplitude of air fuel ratio feedback correction coefficient wherein said slice levels comprise corresponding reference values to which the outputs of the air fuel ratio sensors are compared;

(k) counting the number of inversions of the front sensor signal across the stoichiometric mixture ratio;

(l) counting the number of inversions of the rear sensor signal across the set catalyst diagnosing slice levels;

(m) checking whether the ratio of the rear sensor counted value to the front sensor counted value exceeds a predetermined value; and (n) determining that the catalyst has been degraded if the ratio exceeds a predetermined value.

5. The method of diagnosing catalyst degradation of claim 4, wherein the rich discriminating catalyst diagnosing slice level increases and the lean discriminating catalyst diagnosing slice level decreases both with increasing product of the measured period and amplitude of air fuel ratio feedback correction coefficient.

* * * * *